US00RE44947E

(19) United States
(12) Reissued Patent
Kawamura et al.

(10) Patent Number: US RE44,947 E
(45) Date of Reissued Patent: Jun. 17, 2014

(54) SHEET FEEDING DEVICE AND IMAGE FORMING APPARATUS

(71) Applicant: Canon Kabushiki Kaisha, Tokyo (JP)

(72) Inventors: Koji Kawamura, Susono (JP); Yasuzumi Taba, Mishima (JP)

(73) Assignee: Canon Kabushiki Kaisha, Tokyo (JP)

(21) Appl. No.: 13/857,200

(22) Filed: Apr. 5, 2013

Related U.S. Patent Documents

Reissue of:
(64) Patent No.: 7,922,171
Issued: Apr. 12, 2011
Appl. No.: 12/019,107
Filed: Jan. 24, 2008

(30) Foreign Application Priority Data

Jan. 31, 2007 (JP) ..... 2007-020685
Feb. 27, 2007 (JP) ..... 2007-047838

(51) Int. Cl.
*B65H 1/00* (2006.01)

(52) U.S. Cl.
USPC ..... 271/171; 271/145; 271/241

(58) Field of Classification Search
USPC ..... 271/145, 171, 241
See application file for complete search history.

(56) References Cited

U.S. PATENT DOCUMENTS

| | | | | |
|---|---|---|---|---|
| 5,713,570 | A | 2/1998 | Ouchi | |
| 5,931,456 | A | 8/1999 | Laidlaw | |
| 7,464,927 | B2 | 12/2008 | Ito et al. | |
| 7,527,259 | B2 | 5/2009 | Meetze, Jr. et al. | |
| 7,607,657 | B2 | 10/2009 | Kawarago | |
| 7,668,502 | B2 | 2/2010 | Park | |
| 7,862,036 | B2 | 1/2011 | Rowe et al. | |
| 8,136,809 | B2 * | 3/2012 | Furusawa | 271/171 |
| 8,186,671 | B2 * | 5/2012 | Nishiyama | 271/171 |
| 8,366,098 | B2 * | 2/2013 | Kobayashi | 271/171 |
| 8,573,588 | B2 * | 11/2013 | Sunohara | 271/145 |
| 2006/0113723 | A1 * | 6/2006 | Ito et al. | 271/162 |
| 2006/0244203 | A1 * | 11/2006 | Kirby et al. | 271/162 |
| 2007/0086819 | A1 * | 4/2007 | Park | 399/393 |
| 2008/0001346 | A1 * | 1/2008 | Meetze et al. | 271/171 |
| 2009/0072471 | A1 * | 3/2009 | Rowe et al. | 271/171 |
| 2009/0295072 | A1 * | 12/2009 | Blair et al. | 271/171 |

FOREIGN PATENT DOCUMENTS

| | | |
|---|---|---|
| JP | 2000-238919 | 9/2000 |
| JP | 2004-107009 | 4/2004 |
| JP | 2007-001706 | 1/2007 |

* cited by examiner

*Primary Examiner* — Ernesto Suarez
(74) *Attorney, Agent, or Firm* — Fitzpatrick, Cella, Harper & Scinto

(57) ABSTRACT

A slide cassette is slidably provided in a main cassette of a sheet cassette. When a sheet with a size larger than that of a sheet which may be stored in the main cassette is stored, the slide cassette is sled and moved to extend the sheet cassette. There is provided a fixing portion which may fix the slide cassette and the main cassette in a state in which the sheet cassette is in a shortened or an extended state by sliding the slide cassette. The fixing portion releases the fixing by an operation in which the slide cassette is sled in a shortening direction or extending direction.

8 Claims, 24 Drawing Sheets

DETAILS OF X PART

SHEET FEEDING DEVICE AND IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a sheet feeding device, and an image forming apparatus, and, especially, to a configuration of a sheet cassette storing sheets.

2. Description of the Related Art

Conventionally, there has been widely spread an image forming apparatus, such as a copying machine, a printer, and a facsimile, which is provided with a sheet feeding device, and in which a sheet is fed from the sheet feeding device to an image forming portion for image forming. Moreover, such a sheet feeding device has generally had a configuration in which a main body of the image forming apparatus installs a sheet cassette as a sheet storage portion in such a way that the cassette may be pulled out, and a sheet stored in the sheet cassette is fed to image forming portion through a sheet feeding roller.

The sheet cassette has a rear end regulating member which regulates a position of the rear end of a stored sheet in the sheet feeding direction (hereinafter, called the rear end) when the sheet with a size smaller than that of a sheet with the maximum size which may be stored is stored. The sheet cassette also has a side end regulating member which regulates a side end position in a direction (hereinafter, called a width direction) orthogonal to the sheet feeding direction of a sheet.

Such a sheet cassette is configured so that, while the side end of a sheet is regulated by the side end regulating member, the rear end is regulated by the rear end regulating member, and the position of the side end, and that of the point of the sheet of the sheet are always regulated to predetermined positions. Thereby, as the sheet is positioned at a predetermined position when the sheet cassette is stored in the main body of the image forming apparatus, stable feeding of a sheet may be performed with less skewed feeding and position deviations.

Incidentally, the size of the image forming apparatus has been reduced in recent years in order to improve the space efficiency. However, when the size of the image forming apparatus has been reduced as described above, there is a case in which the length of the main body of the image forming apparatus is shorter than that of a sheet with the maximum length, which is used for image forming. In this case, there is caused a state in which a sheet cassette is protruded from the main body of the image forming apparatus when the sheet cassette is installed in the main body of the image forming apparatus. Thereby, when a user who does not use such a long sheet uses an image forming apparatus, or when the image forming apparatus is used without using a long sheet, there has been caused a problem that the space efficiency becomes worse by a portion by which the sheet cassette is protruded from the main body of the image forming apparatus.

Incidentally, in order to solve the problem, there has been a sheet cassette which includes a main cassette, and a slide cassette which is slidably provided into the main cassette, and in which a slide cassette is pulled out for use according to the size of a sheet. In such a telescopic sheet cassette, the sheet cassette is used as it is in a case in which a small size sheet is stored, and a slide cassette is drawn out for use when a large size sheet is stored. Such technology has been disclosed in Japanese Patent Application Laid-Open No. 2004-107009.

In such a conventional sheet cassette, the slide cassette is fixed at a pulling out position, or at a storing position in the main cassette by a fixed portion. Then when the slide cassette is pulled out, or is stored, fixing of the main cassette and the slide cassette by the fixed portion is released.

FIG. 24A and FIG. 24B are perspective views of such a conventional telescopic sheet cassette. In FIG. 24A and FIG. 24B, there are shown a telescopic sheet cassette 102, a main cassette 103, a slide cassette 104 which is installed in such a way that the cassette may be sled into a main cassette, a fixed portion 106, and a rear end regulating member 105.

When a sheet with a small size is stored, the sheet cassette 102 is used in such a way that, as shown in FIG. 24A, the slide cassette 104 is moved to a position at which the size of the cassette 104 is reduced. Moreover, when a sheet with a large size is stored, the sheet cassette 102 is used in such a way that, as shown in FIG. 24B, the slide cassette 104 is drawn out from the main cassette 103. When the size of the sheet cassette 102 is enlarged, or reduced, a fixed portion 106 which fixes the position of the main cassette 103 and that of the slide cassette 104 between each other is released.

For example, when sheets with different sizes are stored in the sheet cassette in such a conventional sheet cassette, the slide cassette 104 is drawn out or stored. When such operation is performed, the size of a sheet to be stored is changed.

When the size of a sheet is changed as described above, a position of the rear end regulating member 105 is required to be changed, wherein the position determines the position of the rear end of the sheet. That is, a work to move the slide cassette, and that to move the rear end regulating member are different from each other in a conventional sheet cassette. Thereby, when the size of the sheet is changed, a user is required to perform two kinds of operations. That is, there has been a problem that the usability is not good.

SUMMARY OF THE INVENTION

The present invention has been made considering the circumstances as described above, and provides a sheet feeding device, and an image forming apparatus, by which the usability may be improved.

The present invention has the following configuration in a sheet feeding device which feeds a sheet stored in a sheet cassette, wherein the sheet cassette has: a first cassette portion; a second cassette portion slidably connected with the first cassette portion in order to change the size of a sheet storage portion according to the size of a sheet to be stored; and a fixed portion which is able to fix the first cassette portion and the second cassette portion in a state in which the sheet cassette is shortened or extended by sliding of the second cassette portion, wherein the fixing of the fixed portion is released based on either an operation in which the second cassette portion is slid in a shortening direction to shorten the sheet cassette or an operation in which the second cassette portion is slid in an extending direction to extend the sheet cassette.

Further features of the present invention will become apparent from the following description of exemplary embodiments (with reference to the attached drawings).

DESCRIPTION OF THE EMBODIMENTS

Hereinafter, exemplary embodiments according to the present invention will be described in detail, referring to drawings.

Figure 1:
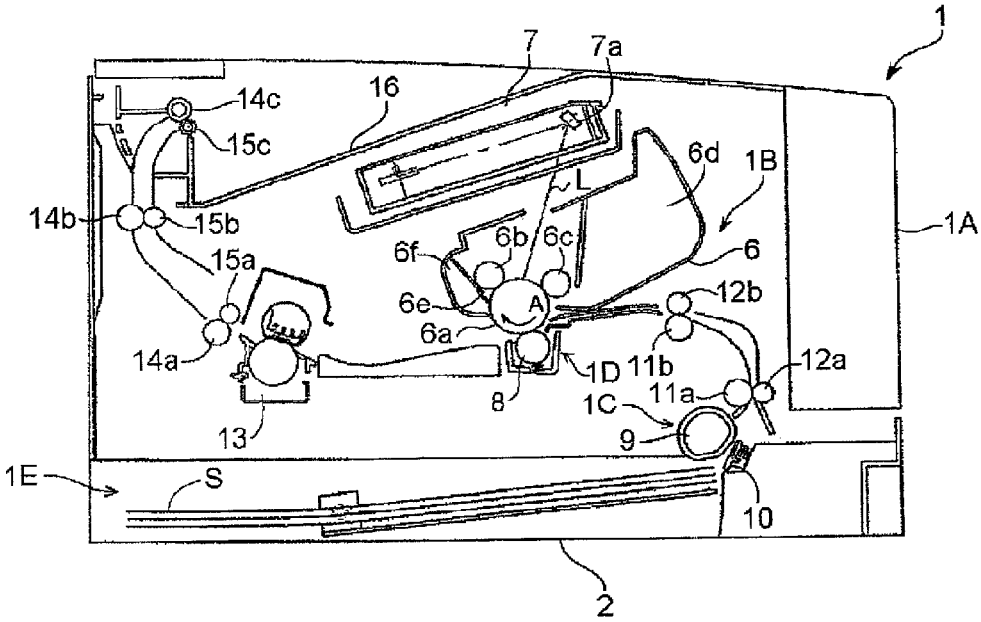
FIG. 1 is a schematic drawing illustrating a configuration of a laser beam printer as one example of an image forming apparatus provided with a sheet feeding device according to a first embodiment of the present invention.

FIG. 1 is a schematic drawing illustrating a configuration of a laser beam printer as one example of an image forming apparatus provided with a sheet feeding device according to a first embodiment of the present invention.

A laser beam printer 1 and a main body 1A of the laser beam printer (hereinafter, called the main body of the printer) are shown in FIG. 1. The laser beam printer 1 has an image forming portion 1B; a sheet feeding device 1C feeding a sheet S to an image forming portion 1B; a fixing portion 13 fixing a toner image transferred on the sheet on the sheet S in a transfer portion 1D; and the like.

The image forming portion 1B is detachably provided with a process cartridge 6 having a photosensitive drum 6a, a charging roller 6b, a development sleeve 6c, a cleaning blade 6e, and a toner container 6d. The image forming portion 1B also has a laser exposure device 7 forming an electrostatic latent image on the photosensitive drum 6a by exposing the surface of the photosensitive drum 6a.

The charging roller 6b is a charging device by which the surface of the photosensitive drum 6a is uniformly charged, and the development sleeve 6c is a development device by which an electrostatic latent image formed by a laser exposure device 7 is made to appear as a visible toner image by adhering toner thereto. Moreover, the cleaning blade 6e removes toner remained on the surface of the photosensitive drum 6a after the toner image is transferred, and stores the removed toner in a waste toner container 6f formed in the process cartridge 6.

The sheet feeding device 1C has a sheet cassette 2, and a sheet feeding roller 9 with a half moon shape feeding a sheet S on the sheet cassette one by one. The sheet cassette 2 is provided as a sheet storage portion in the lower portion of the printer main body 1A, and is detachably installed in the main body 1A of the printer. The sheet cassette 2 also has a separation pad 10 as a separating device. The sheet cassette 2 is detachably installed in an installing space 1E provided in the bottom of the main body 1A of the printer.

The transfer portion 1D includes the photosensitive drum 6a, and a transfer roller 8, wherein the roller 8 is pressed against the photosensitive drum 6a to form a transfer nip, and a toner image on the photosensitive drum 6a is transferred on the sheet S by the transfer roller 8 when the sheet S passes the transfer nip.

Then, an image forming operation in the laser beam printer 1 with the above-described configuration will be described.

When the image forming operation is started, the photosensitive drum 6a is rotated in the direction of an arrow A in the first place, and is charged in a predetermined polarity and in a predetermined potential by the charging roller 6b fed from a not shown high voltage power supply. Then, laser light L is irradiated on the photosensitive drum 6a after the surface is charged, and, thereby, an electrostatic latent image is formed on the photosensitive drum, wherein the light L is irradiated from the laser exposure device 7, based on image information, and is reflected by a reflection mirror 7a.

Subsequently, the electrostatic latent image is developed by adhering moderately charged toner to the electrostatic latent image, and is visualized as a toner image, wherein toner is filled in the toner container 6d along with rotation of the development sleeve 6c to obtain the moderately charged toner, which is supplied onto the photosensitive drum 6a.

On the other hand, the sheet S stacked and stored in the sheet cassette 2 is fed from the sheet feeding roller 9 at predetermined timing, in parallel with the toner image forming operation. The sheet feeding roller 9 is held during standby at a position at which the roller 9 and the separation pad 10 are not contacted with each other, and, when the image forming operation is started, the roller 9 makes one rotation to convey the sheet S along with the rotation in a state in which the sheet S is located between the separation pad 10 and the sheet feeding roller 9.

The surface friction coefficient, the contact angle, and the shape of the separation pad 10 as a sheet separating device are set in such a way that only a sheet S of the uppermost layer is sent out at each sheet feeding operation. Thereby, when the sheets S are fed one on top of the other, conveying of the sheet S on the side of the separation pad is regulated by the separation pad 10, and only the sheet S on the side of the sheet feeding roller is conveyed. Thereby, the sheets S stacked and stored in the sheet cassette 2 are conveyed one by one to a pair of registration rollers 11b and 12b through a pair of conveying rollers 11a and 12a without being conveyed one on top of the other.

Subsequently, the skewed feeding of the sheet S, which has been conveyed to the pair of registration rollers 11b and 12b, is conveyed through the pair of registration rollers 11b and 12b. Thereafter, the sheet S is conveyed to the transfer portion 1D while timing is controlled in such a way that the point of the sheet S and the point of the toner image formed on the surface of the photosensitive drum 6a are in agreement with each other by the pair of registration rollers 11b and 12b. Subsequently, a toner image on the surface of the photosensitive drum 6a is transferred on the sheet S conveyed to the transfer portion 1D as described above.

Here, transfer residual toner, which have not been used for transferring, and is remained on the photosensitive drum 6a, is stored in the waste toner container 6f by the cleaning blade 6e. Then, the photosensitive drum 6a the surface of which has been cleaned repeatedly enters the following image forming process.

Then, the sheet S onto which a toner image has been transferred is conveyed to the fixing portion 13, at which the toner image is fixed on the sheet S. Thereafter, the sheet S on which the toner image has been fixed is conveyed to a pair of discharge rollers 14c and 15c by a pair of conveying rollers 14a and 15a, and a pair of conveying rollers 14b and 15b, which are disposed in a sheet conveying portion downstream of the fixing portion 13. Thereafter, the sheet S is delivered onto a discharge tray 16 provided in the upper portion of the main body of the printer 1A by the pair of discharge rollers 14c and 15.

Figure 2:
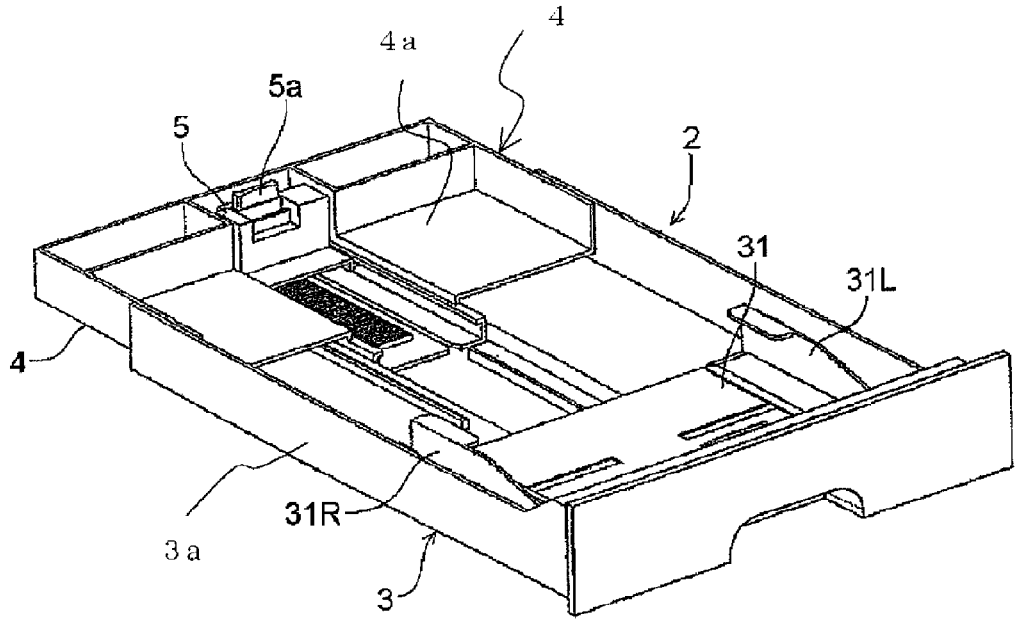
FIG. 2 is a perspective view of a sheet cassette installed in the color laser beam printer.
Figure 3:
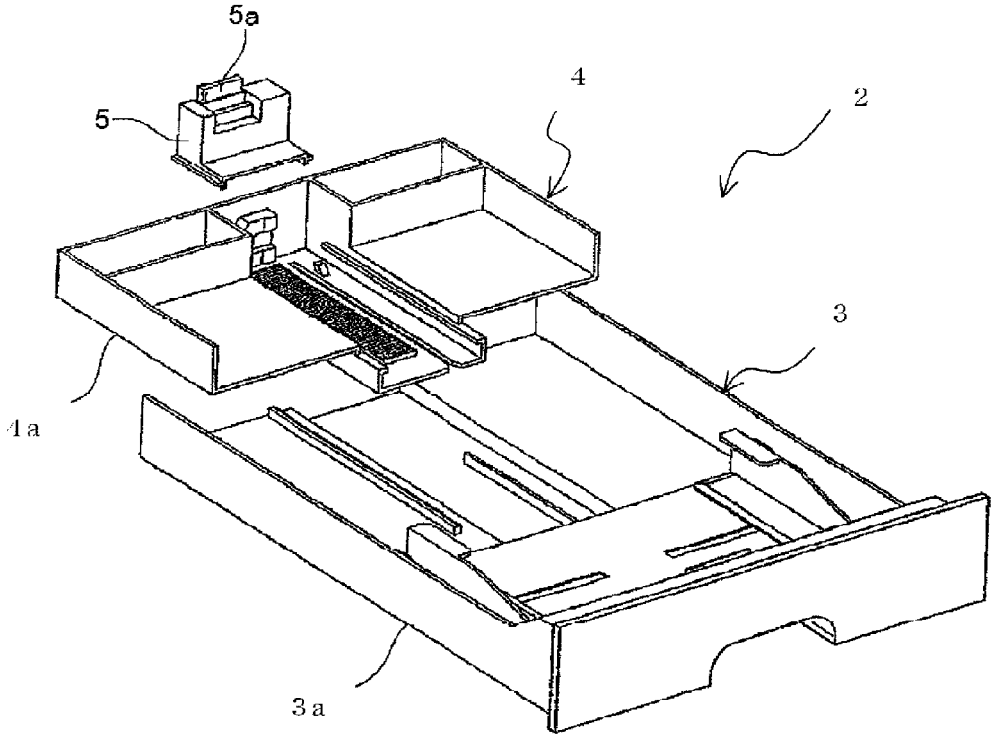
FIG. 3 is an exploded perspective view of the sheet cassette.

FIG. 2 is an exploded perspective view of a sheet cassette, and FIG. 3 is an exploded perspective view of the sheet cassette. As shown in FIG. 2 and FIG. 3, the sheet cassette 2 is provided with: a main cassette (a first cassette portion) 3 as the main body of a sheet storage portion; and a slide cassette (a second cassette portion) 4 which is slidably (drawably) connected with the main cassette 3.

As will be shown in FIG. 13 through FIG. 15 described later, sheets with different sizes are stored in the sheet cassette 2 by drawing out the slide cassette 4, or by storing therein according to the size of a sheet.

The main cassette 3 is provided with a main-cassette main body 3a, and an intermediate plate 31 which supports the point side of the sheet for upward rotation, and presses the sheet S against the sheet feeding roller 9. The sheet S is sent out by rotation of the sheet feeding roller 9.

The slide cassette 4 is provided with: a main body 4a of the slide cassette; and a rear end regulating member 5 movably provided in the sheet feeding direction in order to regulate the rear end position of a sheet stored in the sheet cassette 2.

The intermediate plate 31 is provided with side regulating members 31R and 31L regulating the side end position of a sheet stored in the sheet cassette 2 in the width direction. A stable sheet feeding is realized because a sheet is surely positioned regardless of the size of the sheet by regulating the side end of a sheet by the side regulating members 31R and 31L, and by regulating the rear end by the rear end regulating member 5.

Figure 4:
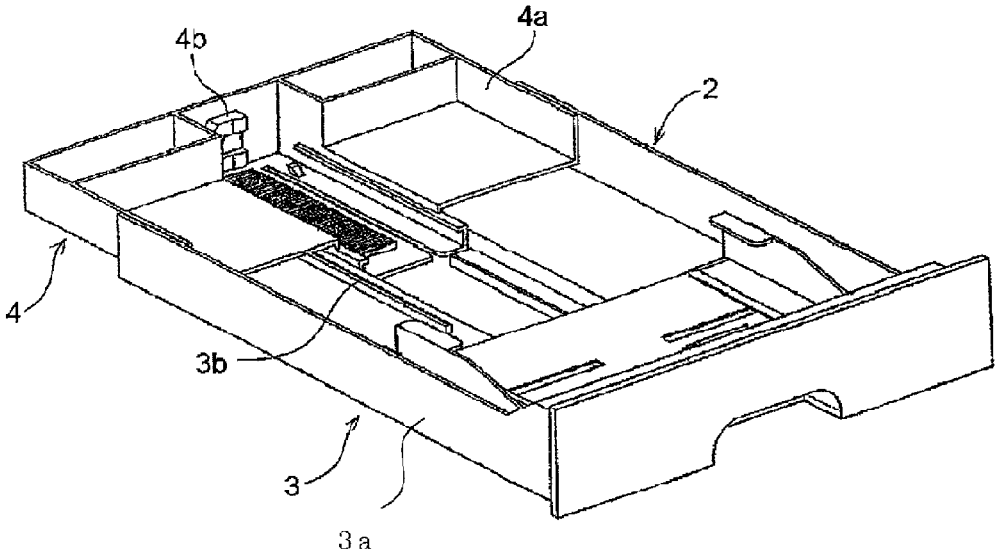
FIG. 4 is a perspective view illustrating a state in which a rear end regulating member is detached from the slide cassette of the sheet cassette.
Figure 5A:
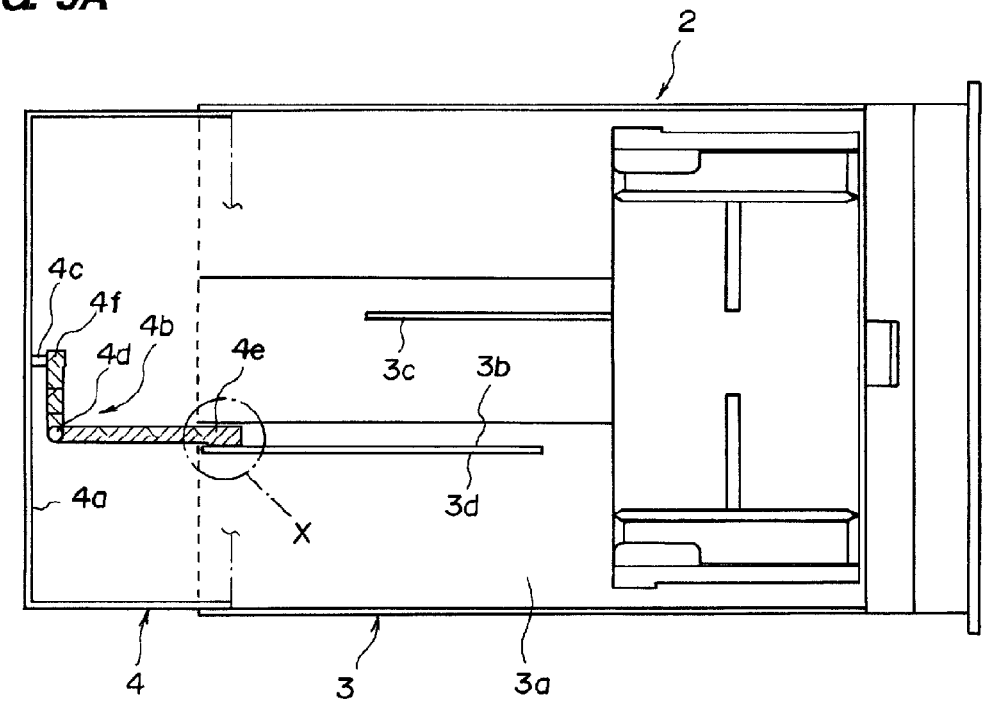
FIG. 5A and FIG. 5B are top views illustrating a state in which the rear end regulating member is detached from the slide cassette.

FIG. 4 is a perspective view illustrating a state in which a rear end regulating member 5 is detached from the slide cassette 4 of the sheet cassette 2. A first fixed portion 4b as shown in FIG. 4 is rotated with a rotating shaft 4d provided vertical to the main body 4a of the slide cassette as a fulcrum as shown in FIG. 5A.

Figure 5B:
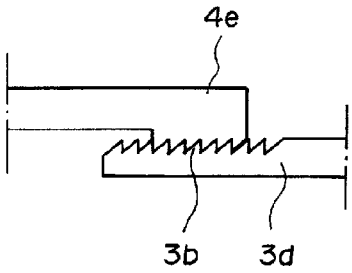

A first fixing spring 4c is provided between this first fixed portion 4b and the main body 4a of the slide cassette, and a receiving surface 4f against which the first fixing spring 4c is pressed is provided at one rotating end of the first fixed portion 4b. Moreover, a latch portion 4e engaging an engaged portion 3b including triangular teeth is provided at the other end of the first fixed portion 4b, wherein the portion 3b is provided perpendicular to the bottom surface of the main cassette main body 3a in the main cassette 3, and, as shown in an X detail drawing of FIG. 5B, is provided on the other sidewall surface of a rib 3d extending in the sheet-feeding direction.

The latch portion 4e in the first fixed portion 4b includes triangular teeth, and to engage the engaged portion 3b in the main-cassette main body 3a usually by energizing force by the first fixing spring 4c.

Then, the slide cassette 4 may be fixed to the main cassette 3 by engaging the latch portion 4e of the first fixed portion 4b and the engaged portion 3b of the main-cassette main body 3a, as described above.

In the first embodiment, the first fixed portion includes: the first fixed portion 4b; the first fixing spring 4c; and the engaged portion 3b of the main-cassette main body 3a, which engages the latch portion 4e of the first fixed portion 4b. The slide cassette 4 is fixed to the main cassette 3 by the first fixed portion in such a way that a state in which the sheet cassette 2 is shortened, or a state in which the cassette 2 is extended is kept.

Figure 6:
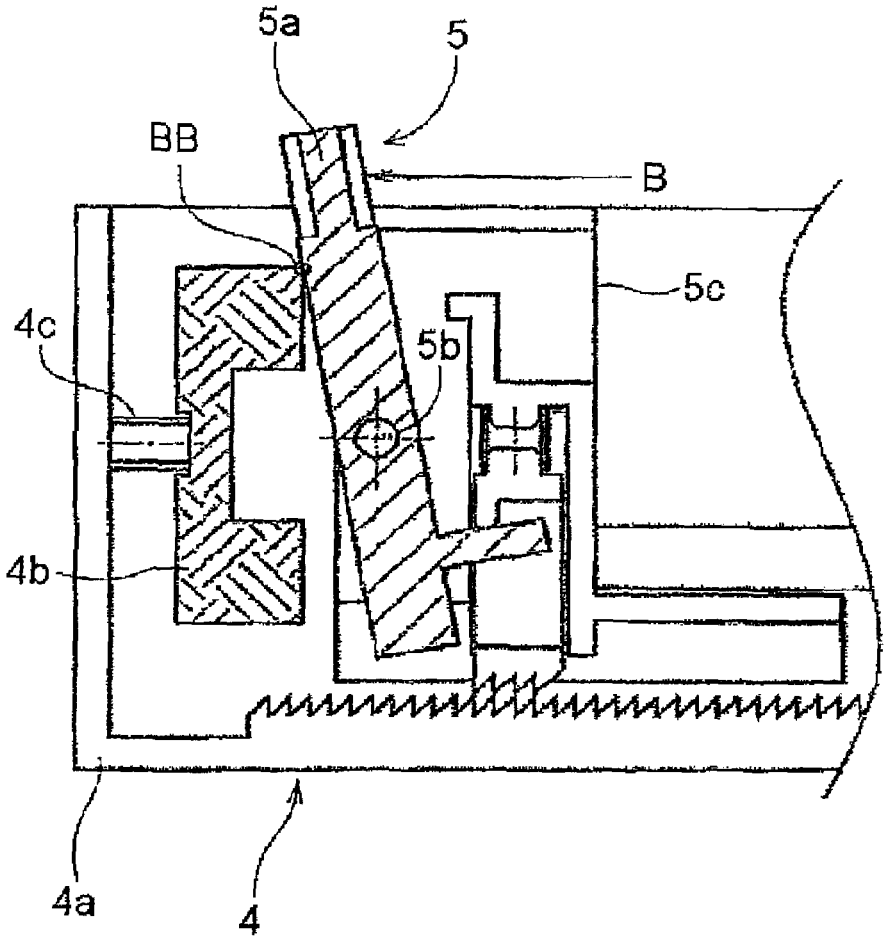
FIG. 6 is a view illustrating a state in which, in a portion installing the rear end regulating member, a rear end regulating lever provided in the rear end regulating member is pressed in a slide cassette drawing direction.

FIG. 6 is a cross section of an installation portion of the rear end regulating member 5 in the slide cassette 4, and, as shown in FIG. 6, the rear end regulating member 5 is provided with: a rear end regulating lever (operation portion) 5a; and a rear end regulating holder 5c holding the rear end regulating lever 5a in such a way that the lever 5a may be rotated centering around the rotating shaft 5b.

When the slide cassette 4 is pulled out, for example, according to the size of a sheet, that is, when the sheet cassette 2 is extended from a shortened state, the rear end regulating lever 5a is pressed in the direction of an arrow B (in the extending direction) as shown in FIG. 6.

Then, when the rear end regulating lever 5a is pressed as described above, the rear end regulating lever 5a is inclined centering around the rotating shaft 5b shown in FIG. 6, and the first fixed portion 4b is pressed in at a point BB, resisting the force of the first fixing spring 4c. When the rear end regulating lever 5a is pushed as described above, the first fixed portion 4b is moved in parallel by a not-shown guide member.

Thereby, engagement between the latch portion 4e of the first fixed portion 4b shown in FIG. 5A and the engaged portion 3b of the main-cassette main body 3a is released to release fixing of the first fixed portion 4b. That is, the slide cassette 4 may be drawn out. Thereby, when the rear end regulating lever 5a is further pressed in the direction of the arrow B, the slide cassette 4 may be drawn out.

When pressing of the rear end regulating lever 5a is released after the slide cassette 4 is drawn out as described above, the latch portion 4e and the engaged portion 3b in the main cassette main body 3a are engaged with each other to fix the slide cassette 4 to the main-cassette main body 3.

Figure 7:
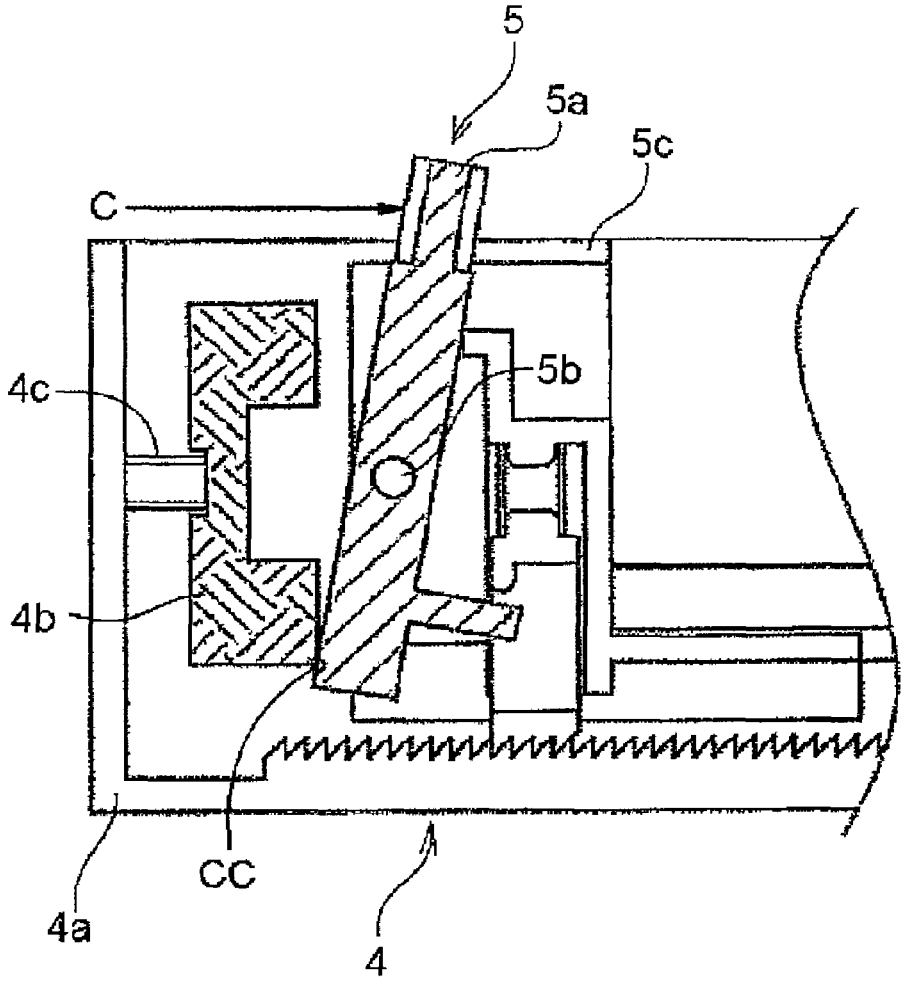
FIG. 7 is a view illustrating a state in which the rear end regulating lever provided in the rear end regulating member is pressed in a slide cassette storing direction.

On the other hand, when the slide cassette 4 is stored according to the size of a sheet, that is, when the sheet cassette 2 is shortened from a extended state, the rear end regulating lever 5a is pressed in the direction of an arrow C (in the shortening direction) as shown in FIG. 7. Then, when the rear end regulating lever 5a is pressed as described above, the rear end regulating lever 5a is inclined in the direction of the arrow C, centering around the rotating shaft 5b, and the first fixed portion 4b is pushed at a point CC, resisting the force of the first fixing spring 4c.

Figure 8:
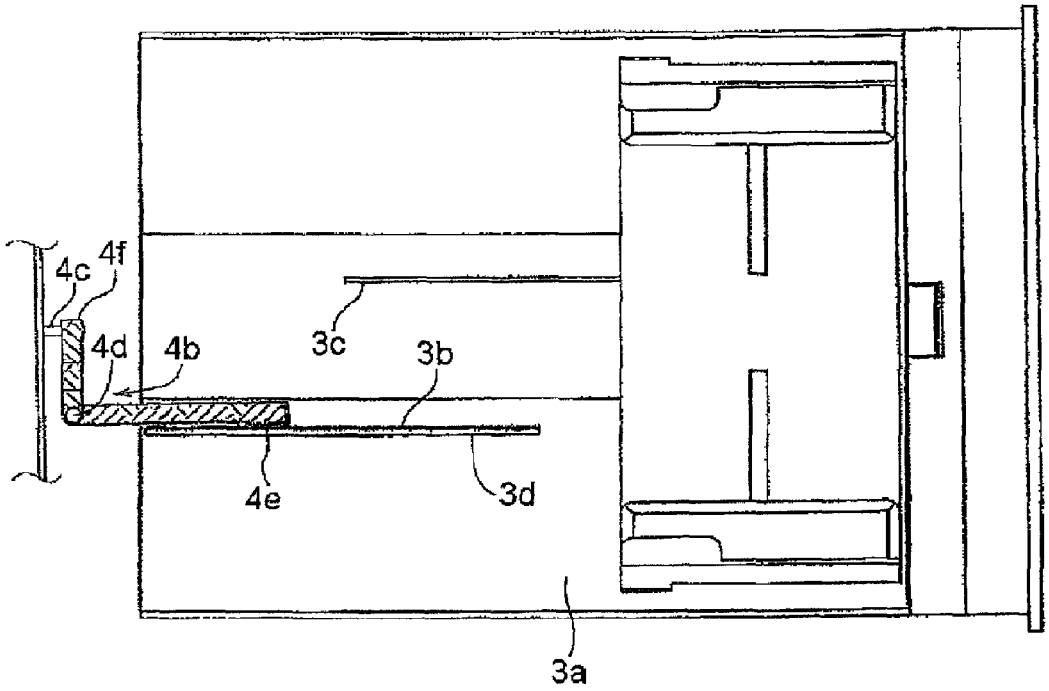
FIG. 8 is a view illustrating a state in which a slide cassette is stored by pressing the rear end regulating lever in the slide cassette storing direction.

Thereby, the first fixed portion 4b is rotated, centering around the rotating shaft 4b, engagement between the latch portion 4e and the engaged portion 3b of the main-cassette main body 3a is released to release fixing of the first fixed portion 4b. That is, the slide cassette 4 may be moved in the storing direction. Thereafter, when the rear end regulating lever 5a is further pressed in the direction of the arrow C under this condition, the slide cassette 4 is stored in the main cassette as shown in FIG. 8. Thereafter, when the pressing of the rear end regulating lever 5 in the direction of the arrow C is released, the slide cassette 4 is fixed to the main cassette 3 by the first fixing spring 4c.

That is, in the first embodiment, the first fixed portion 4b is moved in the engaging releasing direction along with the pressing operation of the rear end regulating lever (lever member) 5a in the sliding direction, and the fixing of the first fixed portion is released.

Incidentally, when sheets with different sizes are stored in the sheet cassette 2, the rear end regulating member 5 is required to be moved according to the size of a sheet to be stored, and to be fixed to the slide cassette 4. Following are the description for the second fixed portion fixing the rear end regulating member 5 on the slide cassette at a position corresponding to the size of a sheet to be stored.

Figure 9A:
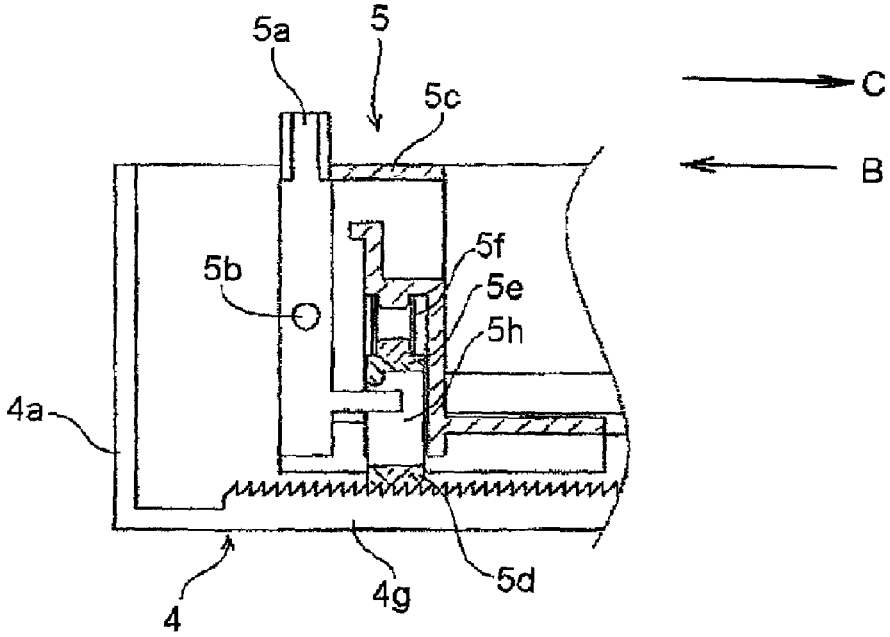
FIG. 9A and FIG. 9B are views illustrating a second fixed portion in the rear end regulating member.
Figure 9B:
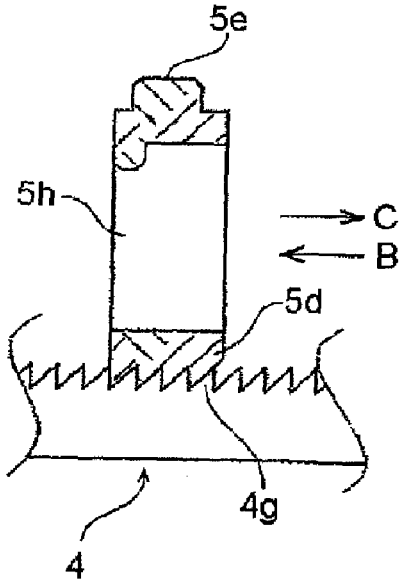

FIG. 9A and FIG. 9B are views illustrating the second fixed portion fixing the rear end regulating member 5 at a position corresponding to the size of a sheet to be stored.

A second fixed portion 5h and a second fixing spring 5f are arranged in the rear end regulating holder 5c as shown in FIG. 9A and FIG. 9B. The second fixed portion 5h is arranged in such a way that the portion 5h may be slidably moved in a vertical direction to the rear end regulating holder 5c, and the bottom surface has a latch portion 5d which engages the engaged portion 4g, wherein the portion 4g is formed on the main body 4a of the slide cassette, and includes triangular teeth extending in a sheet feeding direction. Moreover, a receiving surface 5e of the second fixing spring 5f is provided on the upper surface.

Then, the latch portion 5d in the second fixed portion 5h includes triangular teeth, and to engage the engaged portion 4g on the slide cassette main body 4a usually by energizing force by the second fixing spring 5f. Then, the rear end regulating lever 5a may be fixed to the slide cassette 4 by engagement between the latch portion 5d in the second fixed portion 5h and the engaged portion 4g on the slide cassette main body 4a.

That is, in the first embodiment, the second fixed portion includes: a second fixed portion 5h; the second fixing spring 5f; and an engaged portion 4g on the main body 4a of the slide cassette engaging the latch portion 5d of the second fixed portion 5h.

As shown in FIG. 9B, the shape of teeth of the latch portion 5d of the second fixed portion 5h, and that of the engaged portion 4g on the main body 4a of the slide cassette are provided in such a way that movement of the second fixed portion 5h in a direction (drawing-out direction) opposite to the sheet feeding one shown by the arrow B is prohibited. Moreover, the tooth shape of the latch portion 5d and that of the engaged portion 4g are provided in such a way that, when the second fixed portion 5h is moved in a sheet feeding direction (storage direction) shown by the arrow C, the second fixed portion 5h may be moved while the portion 5h is retracted upward.

That is, (the second fixed portion 5h of) the rear end regulating member 5 is fixed with regard to movement in the direction (drawing-out direction) of the arrow B, but the movement in the direction (storage direction) of the arrow C is possible, based on the shape of the teeth in the latch portion 5d and that of the engaged portion 4g.

Figure 10:
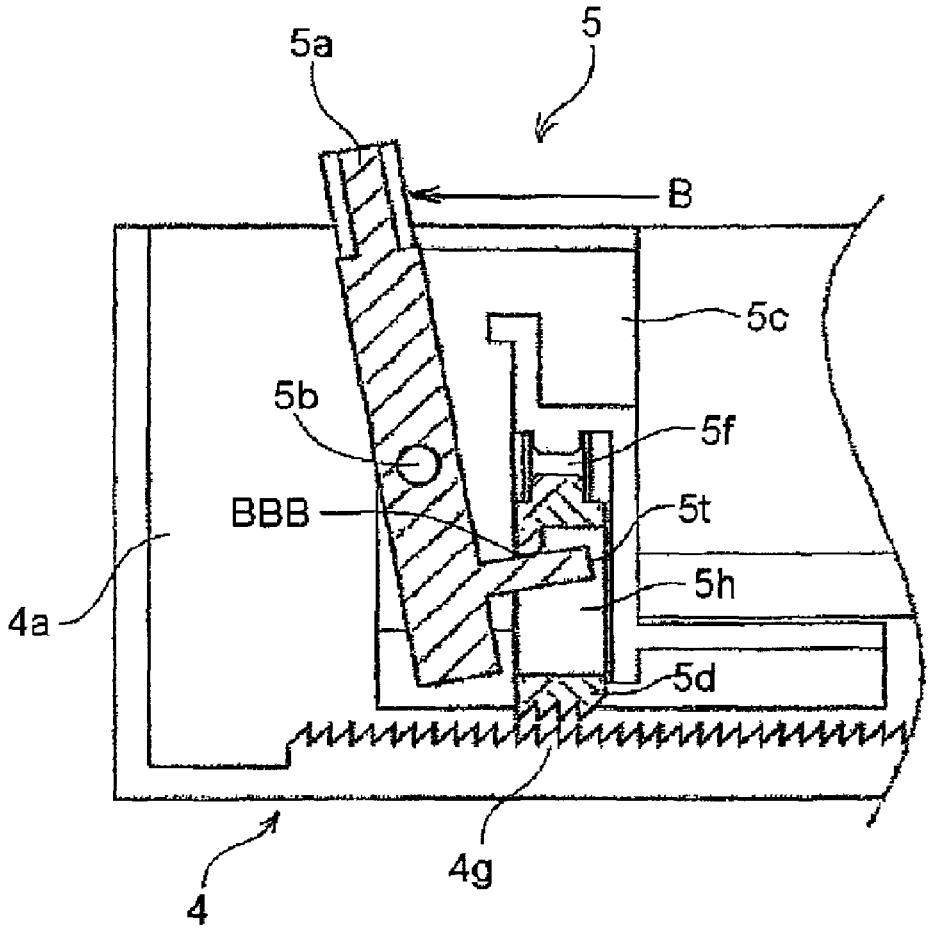
FIG. 10 is a view illustrating a state of the second fixed portion when the rear end regulating lever is pressed in the slide cassette storing direction.

Incidentally, when the rear end regulating lever 5a is pressed in the direction of the arrow B as shown, for example, in FIG. 10, in the second fixed portion configured described above, the rear end regulating lever 5a is inclined in the direction of the arrow B. An engaging protrusion 5t, which engages with the second fixed portion 5h when inclined as described above, is provided on the rear end regulating lever 5a. Thereby, when the rear end regulating lever 5a is inclined, the engaging protrusion 5t raises the second fixed portion 5h at a point BBB, resisting the force of the second fixing spring 5f.

Thereby, engaging between the latch portion 5d and the engaged portion 4g is released to release fixing of the rear end regulating lever 5a to the slide cassette 4. Then, when fixing of the rear end regulating lever 5a is released, as described above, and, thereafter, the rear end regulating lever 5a is pressed in the direction of the arrow B, the rear end regulating member 5 may be moved to a position corresponding to the size of the sheet.

When the rear end regulating lever 5a is pressed in the direction of the arrow B as described above, fixing of the first fixed portion 4b is released as already described. Thereby, the slide cassette 4 is moved to a position corresponding to the size of the sheet integrally with the rear end regulating member 5. When pressing of the rear end regulating lever 5a in the direction of the arrow B is released after the rear end regulating member 5 reaches a predetermined position, the rear end regulating member 5 is fixed to the slide cassette 4, and the slide cassette 4 is fixed to the main cassette 3 by the second fixing spring 5f.

Incidentally, the slide cassette 4 is sled integrally with the rear end regulating member 5 when the slide cassette 4 is sled in the extending direction in which the sheet cassette 2 is extended in the first embodiment. Moreover, when the slide cassette 4 is sled in the shortening direction in which the sheet cassette 2 is shortened, the slide cassette 4 is sled integrally with the rear end regulating member 5 to a predetermined position.

Figure 11:
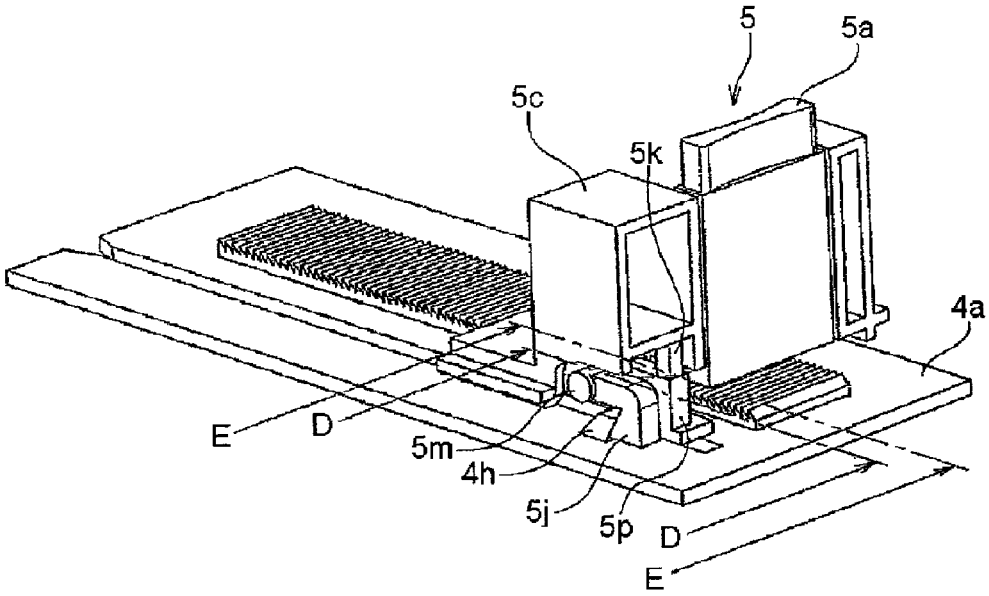
FIG. 11 is a perspective view illustrating a configuration of a third fixed portion fixing the rear end regulating member in the slide cassette.
Figure 12A:
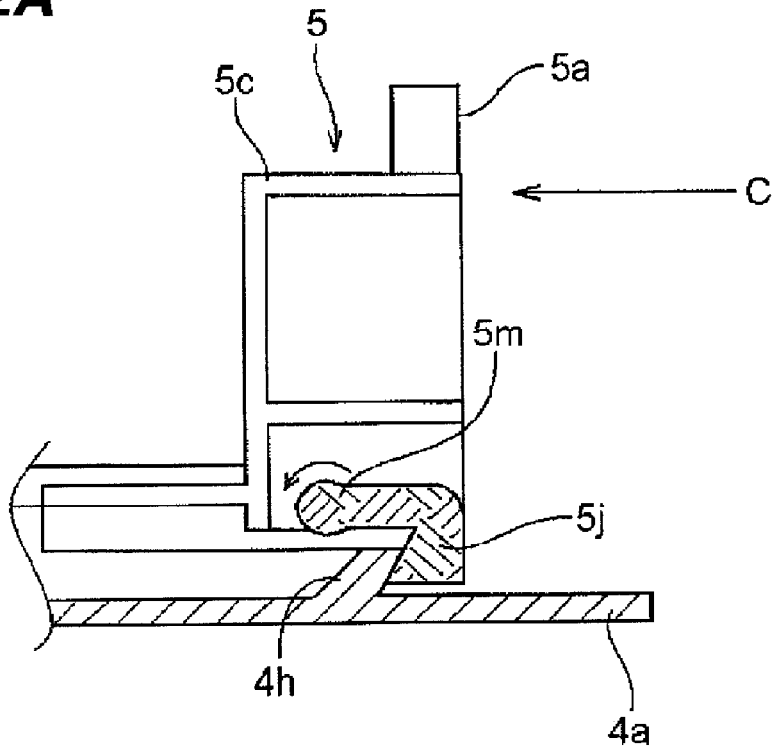
FIG. 12A is a sectional view taken on line D-D in FIG. 11.
Figure 12B:
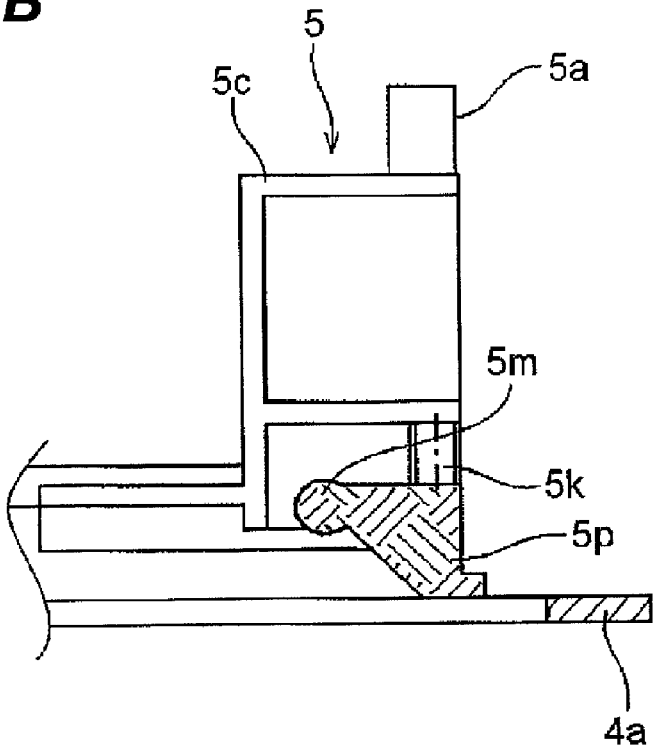
FIG. 12B is a sectional view taken on line E-E in FIG. 11.

Subsequently, the third fixed portion is described below which fixes the rear end regulating member 5 at the slide cassette 4 for synchronization with the extending and contracting operation of the slide cassette 4 as described above. FIG. 11 is a perspective view illustrating a configuration of the third fixed portion fixing the rear end regulating member 5 in the slide cassette 4. FIG. 12A is a sectional view taken on line D-D in FIG. 11, and FIG. 12B is a sectional view taken on line E-E in FIG. 11.

In the rear end regulating holder 5c, a third fixed portion 5j is rotatably provided to the rear end regulating holder 5c, centering around the rotating shaft 5m. In the third fixed portion 5j, an abut portion 5p is formed which may abut to a fixing releasing member 3c protruding on the bottom surface of the main-cassette main body 3a as shown in FIG. 13. The third fixed portion 5j is energized downward by a third fixing spring 5k.

The third fixed portion 5j engages the engaged portion 4h protruded from the slide cassette main body 4a usually by energizing force by the third fixing spring 5k. When the rear end regulating member 5 is pressed as described above in the direction of the arrow C by engaging the third fixed portion 5j with the engaged portion 4h on the slide cassette main body 4a, the rear end regulating member 5 is fixed to the slide cassette 4.

That is, in the first embodiment, the third fixed portion includes: the third fixed portion 5j; the third fixing spring 5k; and the engaged portion 4h protruding on the slide cassette main body 4a engaged with the third fixed portion 5j. When the rear end regulating member 5 is pressed by the third fixed portion in the direction of the arrow C, the rear end regulating member 5 and the slide cassette 4 are moved as one body until the slide cassette 4 reach a predetermined position. Releasing of the third fixed portion will be described later.

Subsequently, extending operation and contracting one of the sheet cassette 2 according to the first embodiment will be described.

Firstly, an operation is described by which the length of the sheet cassette 2 in the sheet feeding direction is shortened to a shorter one, for example, from an A3 size specification to an A4 size specification, a B5 size specification, and an A5 size specification.

Figure 13:
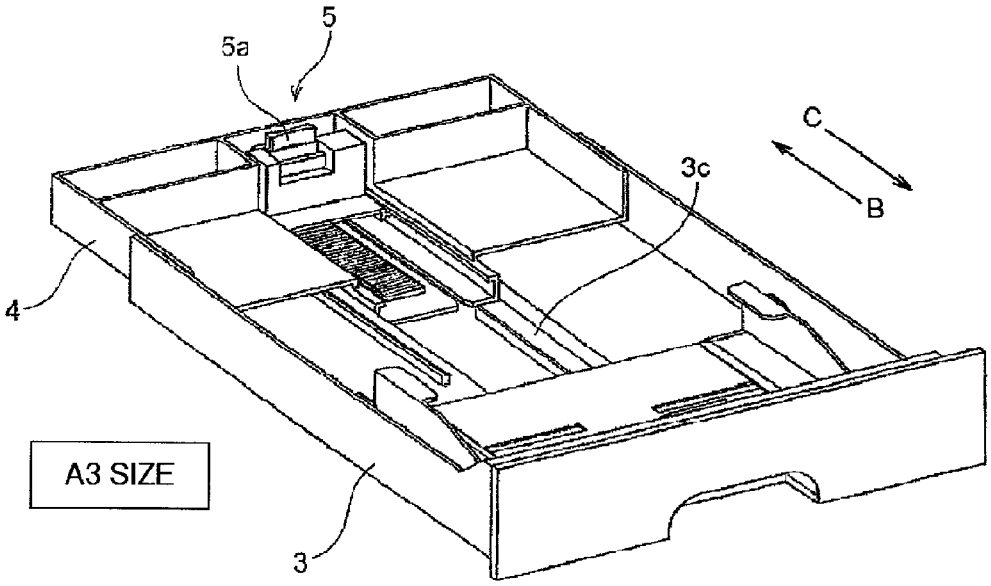
FIG. 13 is a perspective view illustrating a state in which the sheet cassette is set in an A3 size specification.

FIG. 13 is a perspective view illustrating a state in which the sheet cassette 2 is set in an A3 size specification. When a specification is changed from this state to the A4 size specification, the rear end regulating lever (lever member) 5a is pressed in the direction of the arrow C.

Thereby, the rear end regulating lever 5a pushes the first fixed portion 4b as shown in FIG. 7, and, thereby, fixing of the slide cassette 4 to the main cassette 3 by the first fixed portion is released.

When the rear end regulating lever 5a is pressed in the direction of the arrow C, the rear end regulating member 5 is fixed to the slide cassette 4 by the third fixed portion as shown in FIG. 12A and FIG. 12B. Thereby, when the rear end regulating lever 5a is kept being pushed thereafter, the rear end regulating member 5 and the slide cassette 4 are moved in a direction in which the sheet cassette 2 is shortened.

Figure 14A:
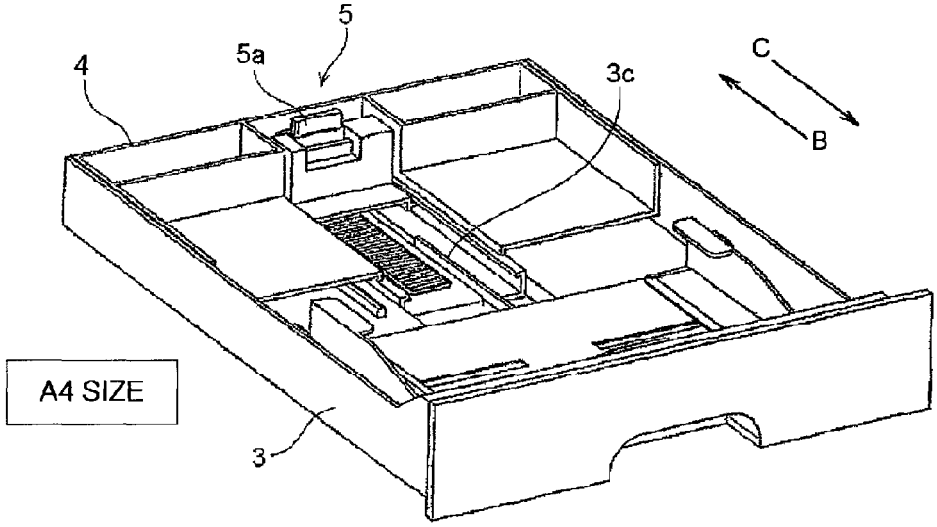
FIG. 14A is a perspective view illustrating a state in which the sheet cassette is set in an A4 size specification.
Figure 14B:
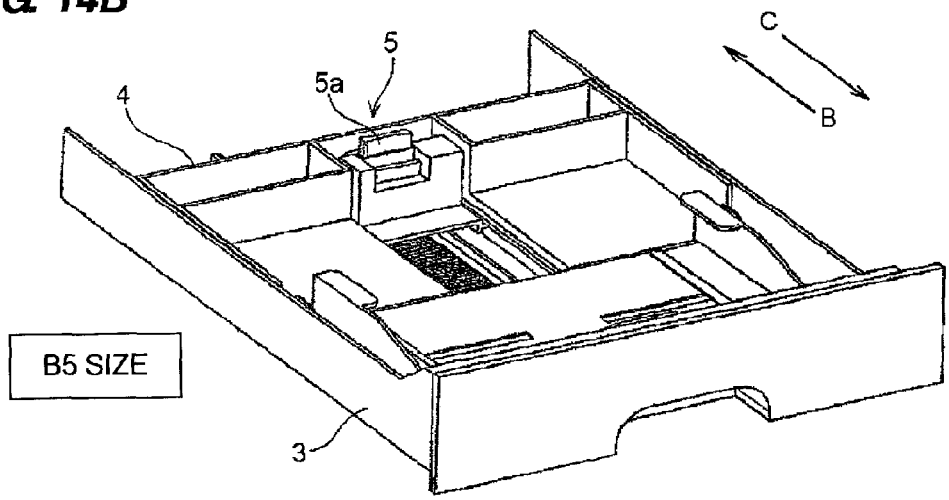
FIG. 14B is a perspective view illustrating a state in which the sheet cassette is set in a B5 size specification.

Thereafter, the sheet cassette 2 has an A4 size specification shown in FIG. 14A. Furthermore, when the rear end regulating lever 5a is kept being pushed in the direction of the arrow C thereafter, the slide cassette 4 is stored in the main cassette. At this time, the sheet cassette 2 has a B5 size specification shown in FIG. 14B. That is, the first embodiment has a configuration in which the slide cassette 4 is drawn out when a sheet with a size of a B5 size or larger is stored.

Incidentally, when a sheet with the B5 size specification or smaller, the rear end regulating lever 5a is kept being pushed in the direction of the arrow C thereafter. As the slide cassette 4 is stored in the main cassette, only the rear end regulating member 5 is moved thereafter.

In order to move only the rear end regulating member 5 as described above, it is required to release fixing of the third fixed portion 5j. Thereby, in the first embodiment, the fixing releasing member 3c is protruded on the bottom surface of the main-cassette main body 3a as shown in FIG. 13 as described above, and, when the slide cassette 4 is stored, the fixing releasing member 3c is provided in such a way that the member 3c abuts against the abut portion 5p shown in FIG. 12B.

Moreover, when the rear end regulating member 5 is further pushed after the abut portion 5p abuts against the fixing releasing member 3c as described above, the third fixed portion 5j is rotated upward in the direction of the arrow shown in FIG. 12A, centering around the rotating shaft 5m, while resisting the third fixing spring 5k. Thereby, the third fixed portion 5j is released from the engaged portion 4h of the slide cassette main body 4a, and fixing of the third fixed portion to the slide cassette 4 in the rear end regulating member 5 is released.

Thus, when the rear end regulating member 5 is further pushed after the slide cassette 4 is moved to a predetermined position in such a way that a sheet with a B5 size specification is stored in the main cassette, fixing by the third fixed portion is released.

When the rear end regulating lever 5a is further kept being pushed in the direction of the arrow C thereafter, the rear end regulating member 5 is moved on the slide cassette 4, based on the tooth shape of the latch portion 5d of the second fixed portion 5h, and that of the engaged portion 4g on the slide cassette main body 4a as shown in FIG. 9B. Then, the rear end regulating member 5 is immediately moved to a position corresponding to the A5 size specification as shown in FIG. 15.

Subsequently, an operation is described below in which the sheet cassette 2 is extended in the direction in which the length in the sheet feeding direction is lengthened, for example, from the A5 size specification to the B5 size specification, the A4 size specification, and the A3 size specification.

Figure 15:
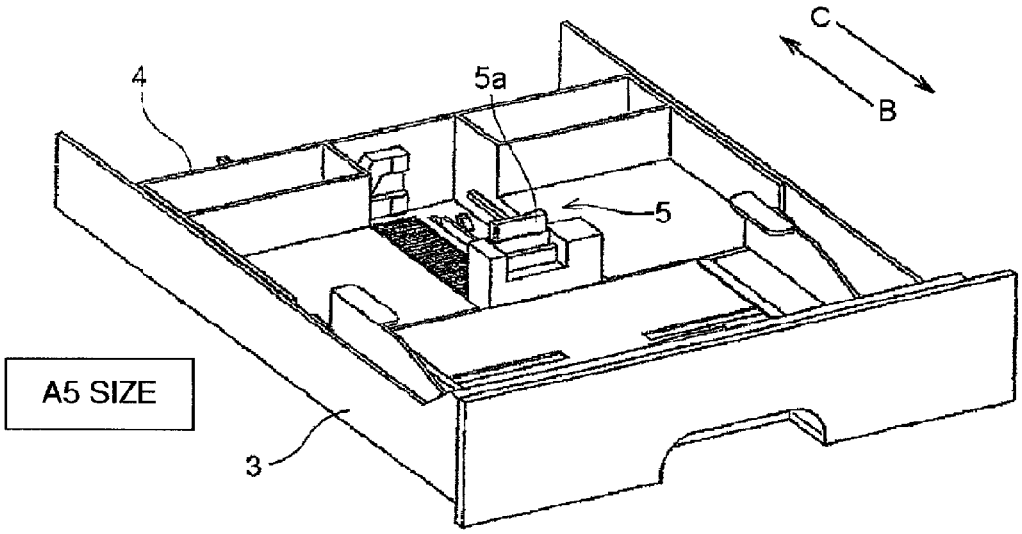
FIG. 15 is a perspective view illustrating a state in which the sheet cassette is set in an A5 size specification.

When setting of the sheet cassette 2 is changed from a state set for the A5 size specification to a state for the B5 size specification as shown in FIG. 15, the rear end regulating lever 5a is pressed in the direction of the arrow B in the first place. Thereby, as shown in FIG. 10, the engaging protrusion 5t of the rear end regulating lever 5a raises the second fixed portion 5h to release fixing of the rear end regulating member 5 to the slide cassette 4. Thereby, the rear end regulating member 5 is moved on the slide cassette 4 to obtain a configuration corresponding to the B5 size specification shown in FIG. 14B.

When this state is achieved, abutment of the fixing releasing member 3c to the abut portion 5p is released, the third fixed portion 5j is rotated downward by the third fixing spring 5k, centering around the rotating shaft 5m, and the third fixed portion 5j engages the engaged portion 4h on the slide cassette main body 4a. Thereby, the rear end regulating member 5 is fixed to the slide cassette 4.

Subsequently, when the rear end regulating lever 5a is further pressed in the direction of the arrow B, the rear end regulating lever 5a pushes the first fixed portion 4b as shown in FIG. 6 to release fixing of the slide cassette 4 to the main cassette 3. Thereafter, when the rear end regulating lever 5a is kept being pushed in the direction of the arrow B, the rear end regulating member 5 and the slide cassette 4 are moved as one body, corresponding to a specification from the A4 size specification shown in FIG. 14A to the A3 size specification shown in FIG. 13.

FIG. 16A through FIG. 16E are schematic views illustrating the outline of the extension operation and contraction operation of the sheet cassette 2 according to the present embodiment, which has been described.

Figure 16A:
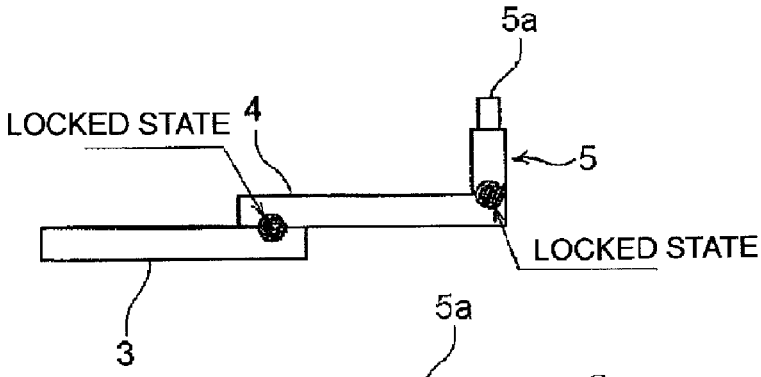
FIG. 16A through FIG. 16E are schematic views illustrating an outline of expansion and contraction operation of a sheet cassette according to the first embodiment.

FIG. 16A shows a state in which the slide cassette 4 is drawn out to a position corresponding to the maximum size of a sheet. At this state, the slide cassette 4 is in a fixed state (● mark) to the main cassette 3 by the first fixed portion, and the rear end regulating member 5 is in a fixed state (● mark) to the slide cassette 4 by the third fixed portion.

Figure 16B:
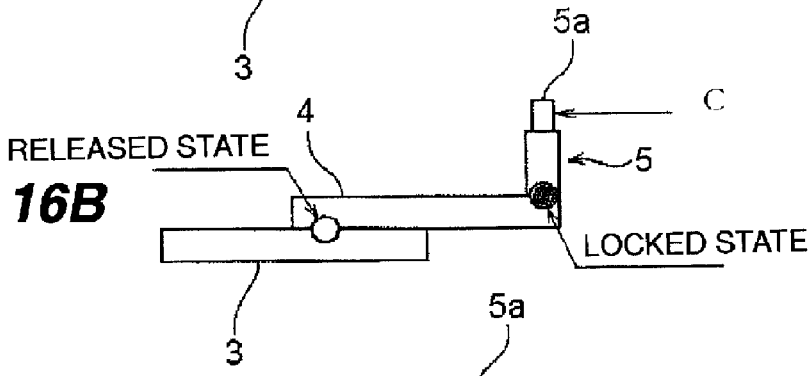

FIG. 16B shows a state in which the rear end regulating lever 5a of the rear end regulating member 5 is operated in the direction of the arrow C, and, as described above, the first fixed portion is put into a release state (○ mark) by operating the rear end regulating lever 5a to store the slide cassette 4 in the main cassette.

Figure 16C:
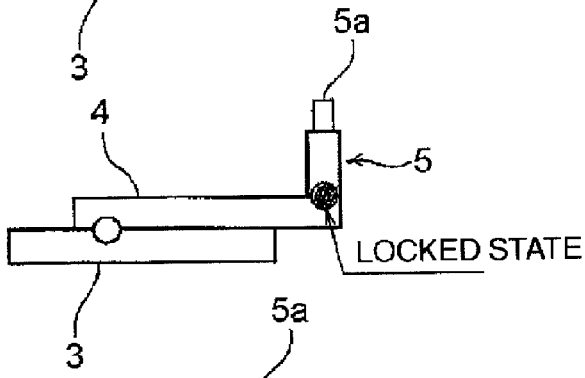
Figure 16D:
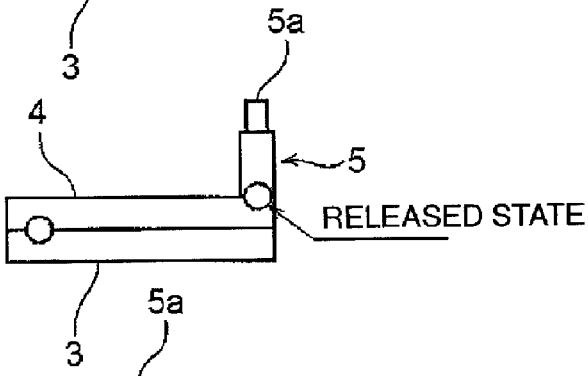
Figure 16E:
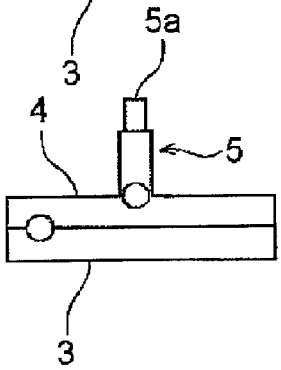

FIG. 16C shows a state just before the state in which the slide cassette 4 is stored in the main cassette. At this time, the third fixed portion is still in a fixed state (● mark). FIG. 16D shows a state just after the state in which the slide cassette 4 is stored in the main cassette. At this time, the third fixed portion is put into a release state (○ mark). Subsequently, the rear end regulating member 5 is fixed at a position corresponding to the minimum size of a sheet shown in FIG. 16E by keeping operating the rear end regulating lever 5a.

As described above, fixing of the slide cassette 4 to the main cassette 3, and fixing of the rear end regulating member 5 to the slide cassette 4 may be released by sliding operation of (the rear end regulating lever 5a of) the rear end regulating member 5.

That is, the usability is improved in the first embodiment, because two operations of an rear end regulating operation by the rear end regulating member 5, and an expansion and contraction operation of the sheet cassette 2 are performed at the same time by one operation of the rear end regulating lever 5a.

In the first embodiment, the engaged portion 3b of the main-cassette main body 3a, which engages the latch portion 4e in the first fixed portion 4b shown in FIG. 5A and FIG. 5B, has a consecutive shape according to a slide range of the slide cassette 4. The reason is that the present invention may be abutted to a size between an A3 size and an A4 size (paper with, for example, a B4 size, or other sizes), and a size between an A4 size and a B5 size (paper with, for example, a letter size, or other size paper). Then, the usability may be improved by forming the engaged portion 3b in the main cassette main body 3a as described above in a case in which various types of specifications for sheet sizes are required.

Subsequently, a second embodiment according to the present invention will be described.

Figure 17:
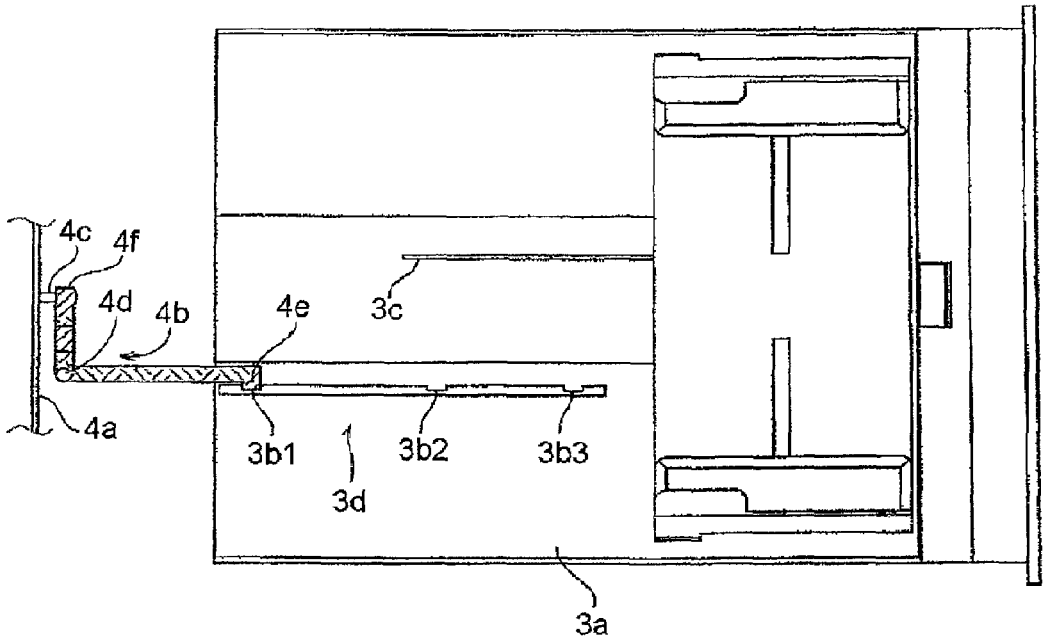
FIG. 17 is a view illustrating a configuration of a sheet cassette according to a second embodiment of the present invention.

FIG. 17 is a view illustrating a configuration of a sheet cassette according to the second embodiment. The same reference numbers in FIG. 17 as those in FIG. 5 indicate the same or equivalent portions. Moreover, FIG. 17 shows a state in which a sheet cassette 2 is in a set state corresponding to an A3 specification.

In FIG. 17, 3b1 through 3b3 are engaging concave portions provided in a main cassette 3 as an engaged portion formed on the sidewall surface of the rib 3d extending in the direction of a sheet feed.

Then, the second embodiment has a configuration in which the latch portion 4e of the first fixed portion 4b engages the engaging concave portions 3b1 through 3b3 by energizing force of the first fixing spring 4c.

Figure 18A:
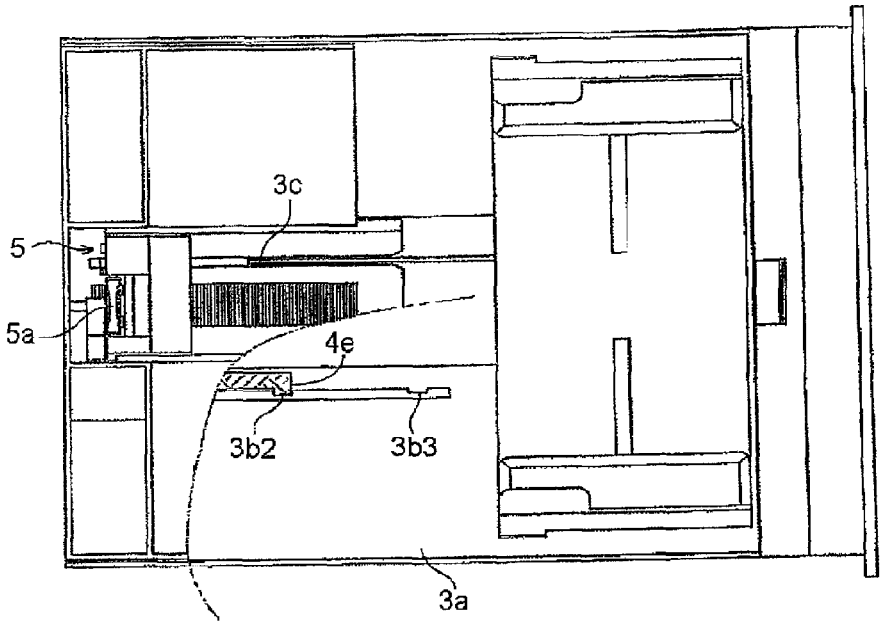
FIG. 18A is a view illustrating a state in which the sheet cassette is set in an A4 size specification.
Figure 18B:
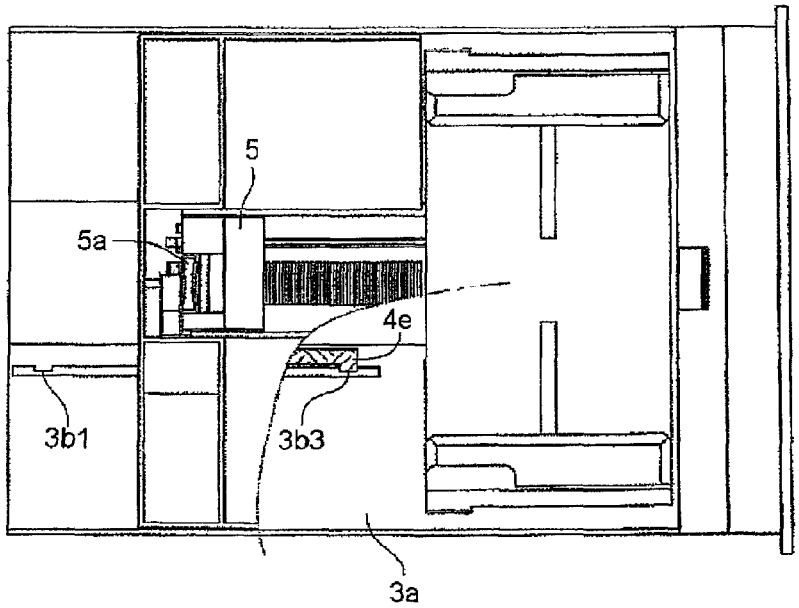
FIG. 18B is a view illustrating a state in which the sheet cassette is set in a B5 size specification.

The engaging concave portion 3b1 is a component by which the slide cassette 4 is drawn out from the main cassette 3, and is fixed at a position corresponding to the A3 size position. Moreover, the engaging concave portion 3b2 is a component by which the slide cassette 4 is drawn out from the main cassette 3, and is fixed at a position corresponding to the A4 size position shown in FIG. 18A. The engaging concave portion 3b3 is a component by which the slide cassette 4 is pushed into the main cassette 3, and is fixed at a position corresponding to the B5 size position shown in FIG. 18B.

Then, the usability is improved even in the second embodiment, because two operations of rear end regulating operation of a sheet, and expansion and contraction operation of the sheet cassette 2 may be performed by one operation of the rear end regulating lever 5a as well as the first embodiment.

Moreover, in the second embodiment, the engaging concave portions 3b1 through 3b3 are provided at sliding positions of the slide cassette 4, for example, at the positions corresponding to the sizes of the stored sheet, for example, to A3, A4, and B5 for positioning of the main cassette 3 and the slide cassette 4. Thereby, the usability is improved in a case corresponding only to paper with a standard size.

Subsequently, a third embodiment according to the present invention will be described. Here, only portions different from the configurations of the first and second embodiments will be described.

Figure 19:
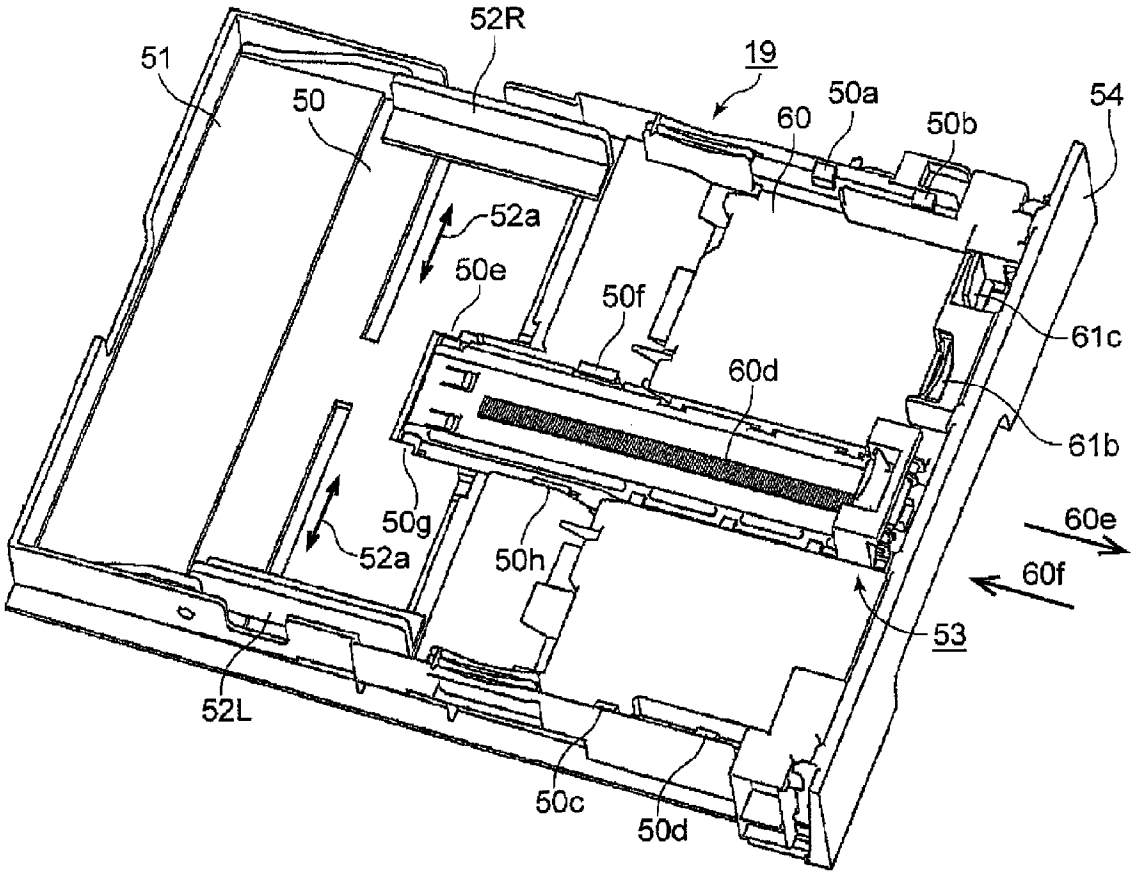
FIG. 19 is a view illustrating a configuration of a sheet cassette according to a third embodiment of the present invention.

FIG. 19 is a view illustrating a configuration of a sheet cassette 19 according to the third embodiment, and the sheet cassette 19 is provided with: a rear end cover 54; a main cassette 50 as a main body of a sheet storage portion; an intermediate plate 51; side regulating members 52R and 52L; and a rear end regulating member 53. The intermediate plate 51 is rotatably provided for supporting a sheet, and pushes a sheet S against the sheet feeding roller 9 (refer to FIG. 1). Then, the sheet S is sent out by rotating the sheet feeding roller 9.

The side regulating members 52R and 52L regulates the side end position of a sheet stored in the main cassette 50 in the width direction, and the rear end regulating member 53 regulates the rear end position of a sheet stored in the main cassette 50. Then, as positioning of a sheet may be performed, regardless of the size of the sheet, by regulating the side end of the sheet by the side regulating members 52R and 52L, and on the other hand, by regulating the rear end of the sheet by the regulating member 53, stable feeding of a sheet may be performed without causing a skewed feeding and a horizontal deviation.

The side regulating members 52R and 52L are connected with each other by not-shown pinion gears, and may be moved in the direction of the arrow 52a in synchronization with each other. Moreover, not-shown friction members contacting with the main cassette 50 are provided on the bottom surface of the side regulating members 52R and 52L.

The side regulating members 52R and 52L are not extended in the width direction even if they receive reaction force of the sheet S by resistance force caused by the friction member during paper feeding. Thereby, malfunctions such as skewed feeding of a sheet may be prevented. The resistance force caused by the friction member is set in such a way that a user simply operates the side regulating members 52R and 52L.

Figure 20A:
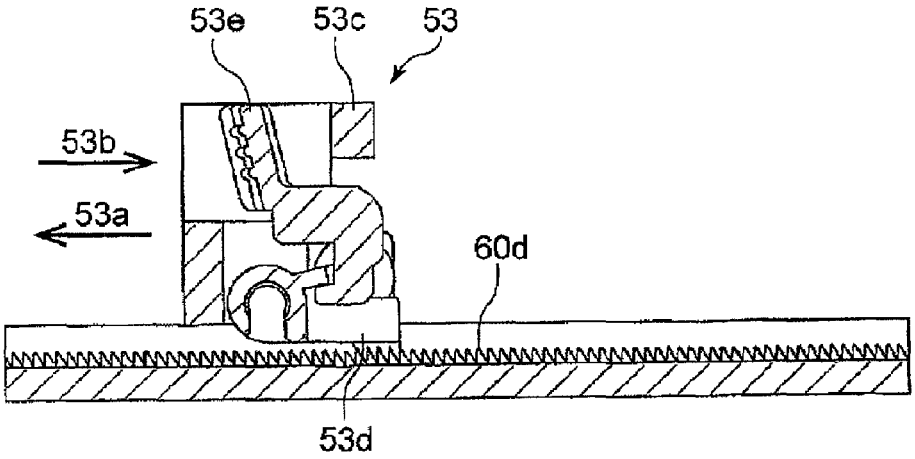
FIG. 20A and FIG. 20B are views illustrating a configuration of a rear end regulating member installed in the sheet cassette.
Figure 20B:
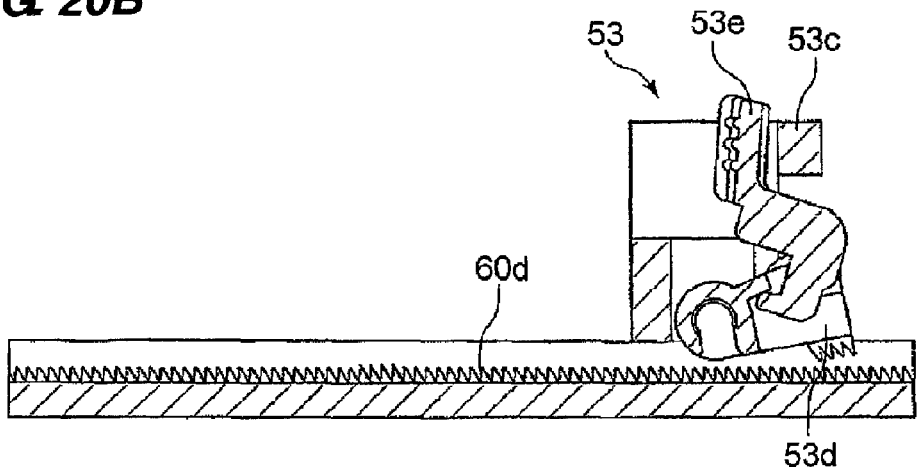

Moreover, the rear end regulating member 53 has a function by which the member 53 abuts against the rear end of a sheet to regulate a position of a sheet as shown in FIG. 20A and FIG. 20B, and the member 53 includes: a rear end regulating plate 53c; a holding member 53d; a switch 53e, and the like. The holding member 53d, and the switch 53e are rotatably supported, respectively, and the holding member 53d is energized by an elastic member such as a not-shown spring in the clockwise direction in FIG. 20A and FIG. 20B.

The holding member 53d is provided with a plurality of teeth with a triangular shape on the bottom surface. The rear end regulating member 53 is held at a set position corresponding to the sheet size by engaging the teeth and the train 60d of rack teeth, which are provided in an after-described slide cassette 60, and include triangular teeth. Moreover, engaging of triangular teeth of the holding member 53d and the train 60d of rack teeth is released by rotating the switch 53e in the clockwise direction in FIG. 20A and FIG. 20B to rotate the holding member 53d in the anti-clockwise direction in FIG. 20, resisting the energizing force of the not-shown member.

Even when the rear end regulating member 53 receives force from the sheet S in the direction of the arrow 53b, for example, during sheet feeding, by engaging between the teeth of the holding member 53d and those of the train 60d of rack teeth, the sheet S may be kept being held at a predetermined position without moving the rear end regulating member 53. When the teeth of the holding member 53d ride across the train 60d of rack teeth, the rear end regulating member 53 may be moved in the direction of the arrow 53a in a state in which a certain load is abutted.

The switch 53e releases engaging of the holding member 53d, and, for example, when the rear end regulating member 53 is moved from a position shown in FIG. 20A to a position shown in FIG. 20B, the switch 53e is pushed in the direction of the arrow 53b in the first place.

When the switch 53e is pushed as described above, the holding member 53d is rotated in the direction in which the teeth of the holding member 53d is detached from the train 60d of rack teeth, and the rear end regulating member 53 may be moved in the direction of the arrow 53a and the arrow 53b. Then, in a state in which the holding member 53d is rotated as described above, that is, in a state in which the switch 53e is pushed, the rear end regulating member 53 may be moved to a position shown in FIG. 20B by pushing the switch 53e in the direction of the arrow 53b.

When the switch 53e is separated after the rear end regulating member 53 is moved to the position shown in FIG. 20B, the holding member 53d is rotated by a not-shown energizing member, and is moved to a position at which the member 53d is engaged with the train 60d of rack teeth. Thereby, the rear end regulating member 53 is held at this position.

Incidentally, the slide cassette 60, according to the present invention, as a drawing portion is drawably provided in the main cassette 50 of the sheet cassette 19 as shown in FIG. 19, wherein the slide cassette 60 extends, or contracts the sheet cassette 19. In the third embodiment, the slide cassette 60 is moved in the direction of an arrow 60e, and an arrow 60f by engaging with a plurality of guides 50a through 50h provided on the sidewall of the main cassette 50.

The whole of the sheet cassette 19 may be shortened by moving the slide cassette 60 in the direction of the arrow 60f, and the whole of the sheet cassette 19 may be extended by moving in the direction of the arrow 60e.

Figure 21:
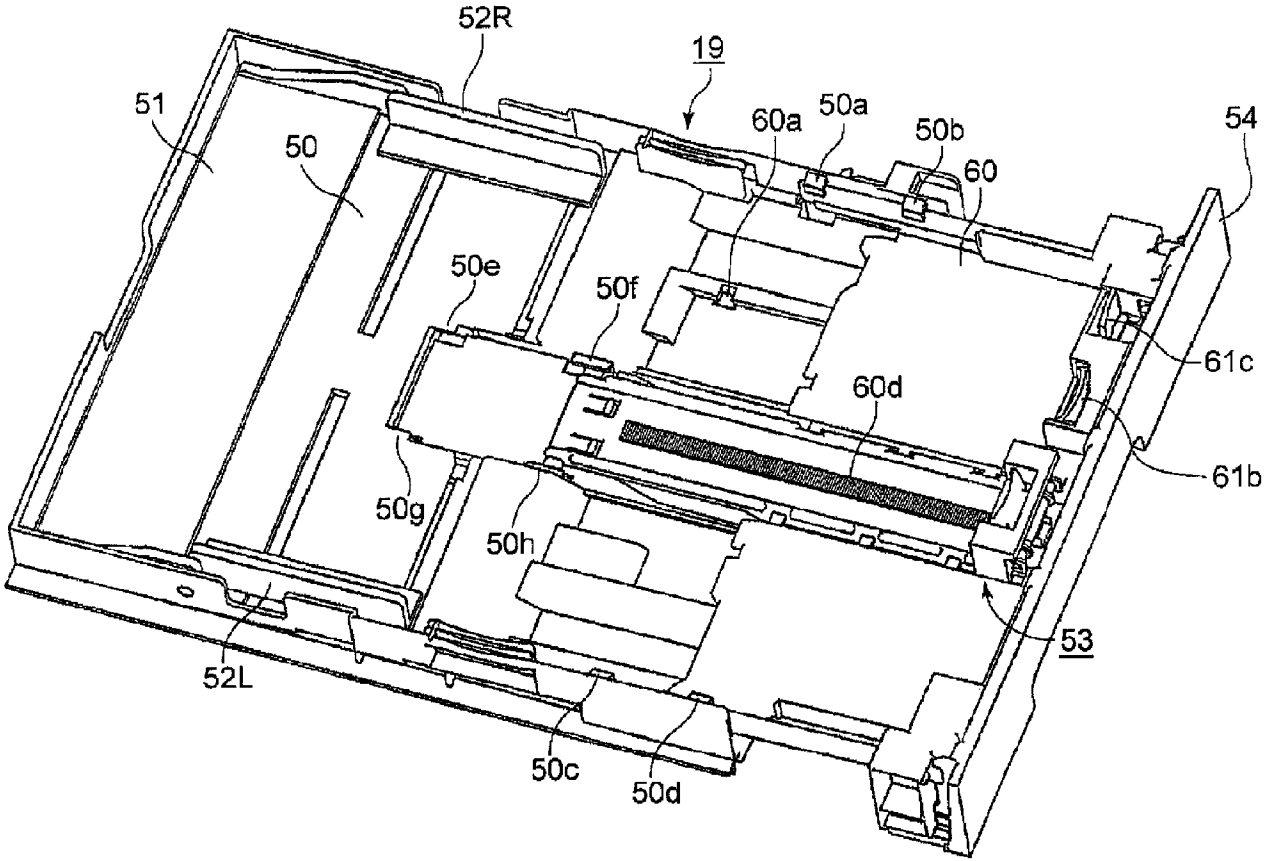
FIG. 21 is a perspective view illustrating a state in which a slide cassette drawably installed in the sheet cassette is drawn out.

When a sheet with a size larger than the size of a sheet which may be stored in the main cassette 50 is stored in the sheet cassette 19, the slide cassette 60 is drawn out in the extending direction indicated by the arrow 60e, and is moved to a position shown in FIG. 21. When a sheet having a size which may be stored in the main cassette 50 is stored, the sheet is stored in the main cassette 50 as show in FIG. 19 by pushing the slide cassette 60 in the shortening direction of the arrow 60f as shown in FIG. 19.

When the slide cassette 60 is drawn out to a position shown in FIG. 21, or when the cassette 60 is returned to a storage position shown in FIG. 19, a fixing lever (lever member) 61 forming the fixed portion is provided to the slide cassette 60 in order to hold the slide cassette 60 at this position.

A fixing lever 61 is swingably provided in the direction of an arrow 61d, and in the direction of an arrow 61e, centering around a swing shaft 60c provided in the slide cassette 60, and is energized in the direction of the arrow 61e by a not-shown spring, as shown in FIG. 22.

Moreover, an engaging portion 61a is protruded on a swing end portion in an opposite side to the drawing direction shown by the arrow 60e, wherein the slide cassette 60 is drawn out in the direction of the arrow 60e. The engaging portion 61a selectively engages a first, and second engaging grooves 60a and 60b as an engaged portion, wherein the grooves are provided in the main cassette 50. When the slide cassette 60 is stored in the main cassette 50, the engaging portion 61a engages the first engaging groove 60a, and when the slide cassette 60 is drawn out, the engaging portion 61a engages the second engaging groove 60b.

On the other hand, a pressing operation portion 61A is provided at one swing end of the fixing lever 61 in the drawing-out direction from the swing shaft 60c, wherein the portion 61A is pressed by a user when the slide cassette 60 is moved. The pressing operation portion 61A is provided with a shortening operation portion 61c provided at one end of the swing shaft 60c, and an extending operation portion 61b provided on the other end.

Then, for example, when the slide cassette 60 is drawn out, the extending operation portion 61b is pressed in the drawing-out direction indicated by the arrow 60e. When the extending operation portion 61b is pressed as described above for drawing-out operation, the fixing lever 61 firstly swings with the swing shaft 60c as a fulcrum in the direction, shown by the arrow 61d, in which engaging between the engaging portion 61a and the first engaging groove 60a is released. Thereby, the engaging portion 61a is detached from the first engaging groove 60a, as shown in FIG. 22B.

Thereafter, when the extending operation portion 61b is further pushed in the direction of the arrow 60e under this condition for drawing out operation, the sheet cassette 19 extends after sliding movement of the slide cassette 60 from the main cassette 50. Then, the slide cassette 60 bumps against a not-shown bumping surface for stop. At this time, the fixing lever 61 is located at a position shown by of FIG. 23A.

Figure 23A:
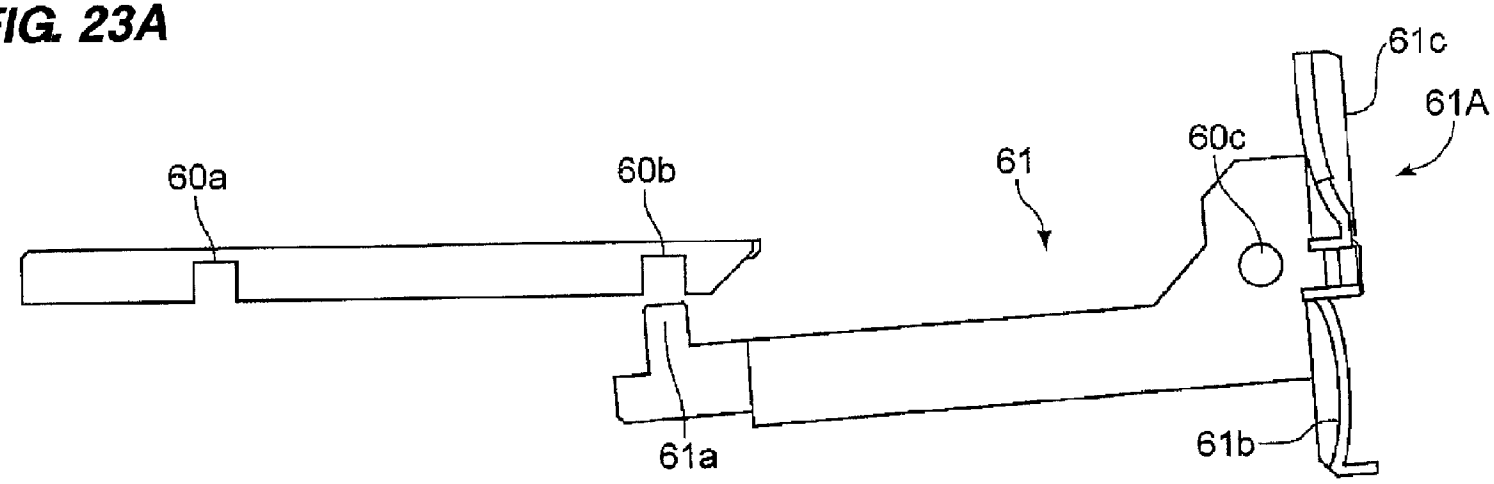
FIG. 23A is a second view illustrating fixing operation of a fixing lever provided in the slide cassette.
Figure 23B:
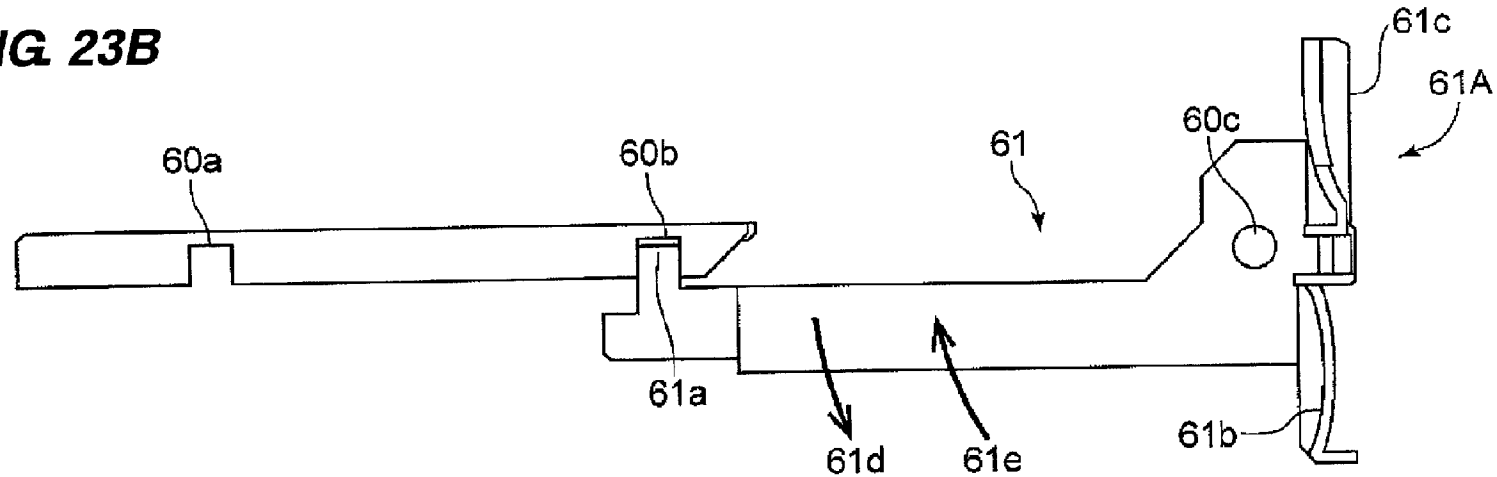
FIG. 23B is a second view illustrating releasing operation of the fixed fixing lever provided in the slide cassette.
Figure 24A:
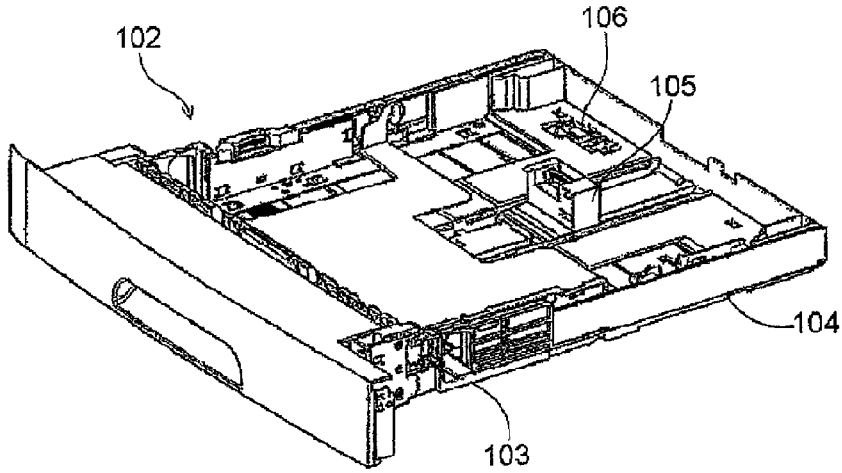
FIG. 24A and FIG. 24B are perspective views of a conventional expansion-and-contraction-type sheet cassette.
Figure 24B:
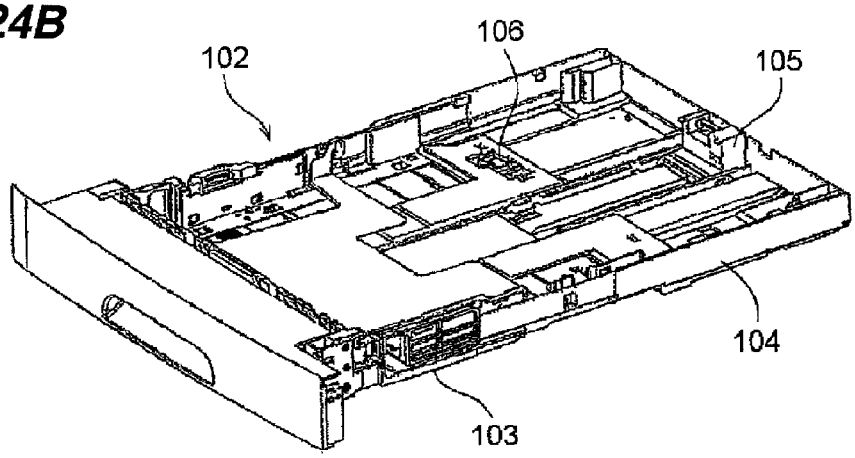

Then, when the extending operation portion 61b is released at this position, the fixing lever 61 swings in the direction of the arrow 61e by a spring. Accordingly, the engaging portion 61a provided at the other swing end of the fixing lever 61 engages the second engaging groove 60b as shown in FIG. 23B. Thereby, the slide cassette 60 is fixed at a position at which the cassette 60 is drawn out to the main cassette 50.

Thus, fixing by the fixing lever 61 may be released and the slide cassette 60 may be drawn out only by drawing-out operation in which the extending operation portion 61b is pressed in such a way that the slide cassette 60 is drawn out. That is, fixing of the slide cassette 60 may be released in synchronization with the drawing out operation of the slide cassette 60 only by pressing operation of the extending operation portion 61b in the moving direction of the slide cassette 60 in order to extend the sheet cassette 19.

On the other hand, when the slide cassette 60 is stored in the main cassette 50, the shortening operation portion 61c is pressed in a direction in which the sheet cassette 19 is shortened in a direction opposite to the drawing out direction.

When the shortening operation portion 61c is pressed as described above, the fixing lever 61 swings in the direction of the arrow 61d shown in FIG. 23B with the swing axis 60c as a fulcrum in the first place. Thereby, the engaging portion 61a swings in a direction in which engaging of the portion 61a and the second engaging groove 60b is released. Thereby, the engaging portion 61a is detached from the second engaging groove 60b as shown in FIG. 23A, and fixing by the fixing lever 61 is released.

Thereafter, when the shortening operation portion 61c is further pressed under this condition, the fixing lever 61, together with the slide cassette 60, is moved. After a while, the slide cassette 60 bumps against the not-shown bumping surface, and the slide cassette 60 stops. At this time, the status of the fixing lever 61 is shown in FIG. 22B.

Figure 22A:
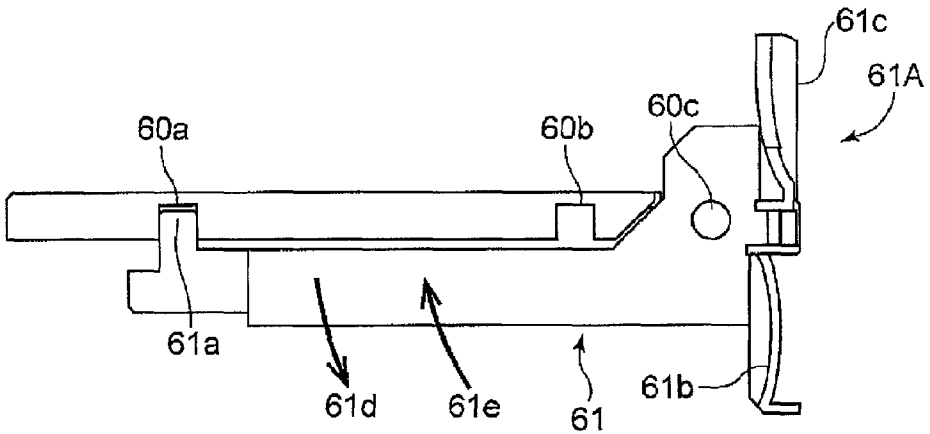
FIG. 22A is a first view illustrating fixing operation of a fixing lever provided in the slide cassette.
Figure 22B:
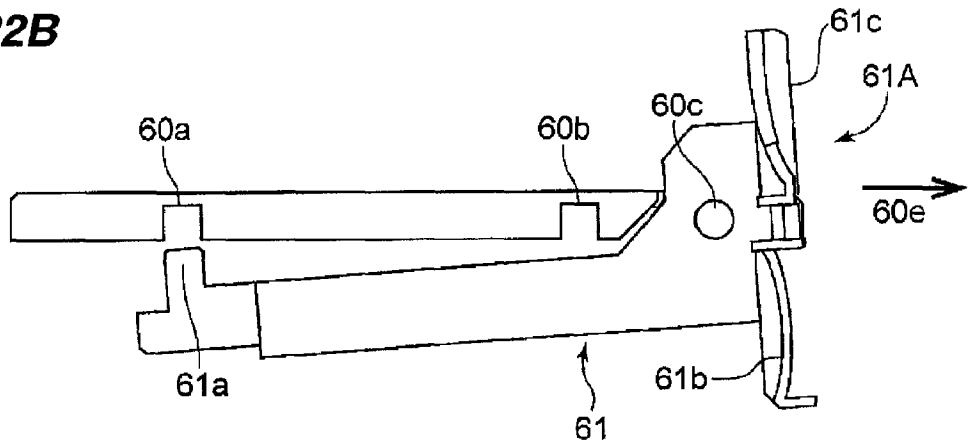
FIG. 22B is a first view illustrating releasing operation of the fixed fixing lever provided in the slide cassette.

Then, when the shortening operation portion 61c is separated at this position, and the pressing is released, the fixing lever 61 swings in the direction of the arrow 61e shown in FIG. 22A by a spring, and the engaging portion 61a engages the first engaging groove 60a. Thereby, the slide cassette 60 is fixed at a position at which the slide cassette 60 is stored to the main cassette 50.

Thus, fixing by the fixing lever 61 may be released only by pressing the shortening operation portion 61c in a direction in which the sheet cassette 19 is shortened and the slide cassette 60 may be stored. That is, fixing of the slide cassette 60 may be released in synchronization with the storage operation of the slide cassette 60 only by pressing the shortening operation portion 61c in the direction, in which the slide cassette 60 is moved, in order to shorten the sheet cassette 19.

As described above, fixing by the fixing lever 61 may be released along with a drawing out operation, and a storing operation of the slide cassette 60 according to the third embodiment. Accordingly, the operability of the slide cassette 60 is improved.

Although only one drawing-out position is provided for the slide cassette 60 in the third embodiment, a plurality of drawing out positions may be acceptably provided according to the sizes of stored sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-20685, filed Jan. 31, 2007, Japanese Patent Application No. 2007-47838, filed Feb. 27, 2007 which are hereby incorporated by reference herein in their entirety.

What is claimed is:

1. A sheet feeding device feeding sheets stored in a sheet storage portion of a sheet cassette, wherein the sheet cassette comprises:

a first cassette portion;

a second cassette portion slidably connected with the first cassette portion in order to change the size of the sheet storage portion according to the size of a sheet to be stored;

a rear end regulating member which is movably provided in the second cassette portion, and which regulates the rear end of a sheet stored in the sheet cassette;

a *first* fixed portion which is able to fix the first cassette portion and the second cassette portion in a state in which the [sheet cassette] *size of the sheet storage portion* is shortened or extended by sliding of the second cassette portion;

[an operating portion provided on the rear end regulating member which releases the fixing by the fixed portion, wherein the fixing of the fixed portion is released by either an operation of which the operating portion is press-operated in a shortening direction where the second cassette portion is slid to shorten the sheet cassette or an operation of which the operating portion is press-operated in an extending direction where the second cassette portion is slid to extend the sheet cassette;]

a second fixed portion which fixes the rear end regulating member to the second cassette portion at a position corresponding to the size of a sheet to be stored;

*an operating portion provided on the rear end regulating member which releases the fixing of the first cassette portion and the second cassette portion by the first fixed portion and which releases the fixing of the rear end regulating member and the second cassette portion by the second fixed portion;* and a third fixed portion which fixes the rear end regulating member and the second cassette portion in such a way that the second cassette portion and the rear end regulating member slide and move on the first cassette portion as one body, wherein, when the second cassette portion is slid to shorten the [sheet cassette] *size of the sheet storage portion* and is positioned at a predetermined position, the third fixing portion is released by engaging a fixing releasing member provided on the first cassette portion so as to release the fixing between the rear end regulating member and the second cassette portion, and when the third fixed portion is released *at the predetermined position*, the second fixed portion is configured to release the fixing of the rear end regulating member by [either the] *an* operation of [which] the operating portion [is press-operated in the shortening direction or the operation of which the operating portion is press-operated in the extending direction].

2. The sheet feeding device according to claim 1, wherein the *first* fixed portion has:

an engaged portion provided in the first cassette portion; and an engaging portion which is provided in the second cassette portion, and engages the engaged portion, wherein the operating portion moves the engaging portion in order to release engaging between the engaging portion and the engaged portion even when the operating portion is pressed in either of the two directions of the shortening direction, and the extending direction.

3. The sheet feeding device according to claim 2, wherein the engaged portion is provided along a sliding range of the second cassette portion.

4. An image forming apparatus comprising a sheet feeding device feeding a sheet stored in a sheet storage portion of a sheet cassette, and an image forming portion forming an image on a sheet fed from the sheet feeding device, wherein the sheet cassette comprises:

a first cassette portion;

a second cassette portion slidably connected with the first cassette portion in order to change the size of the sheet storage portion according to the size of a sheet to be stored;

a rear end regulating member which is movably provided in the second cassette portion, and which regulates the rear end of a sheet stored in the sheet cassette;

a *first* fixed portion which is able to fix the first cassette portion and the second cassette portion in a state in which the [sheet cassette] *size of the sheet storage portion* is shortened or extended by sliding of the second cassette portion; [and]

[an operating portion provided on the rear end regulating member which releases the fixing by the fixed portion, wherein the fixing of the fixed portion is released based on either an operation of which the operating portion is press-operated in a shortening direction where the second cassette portion is slid to shorten the sheet cassette or an operation of which the operating portion is press-operated in an extending direction where the second cassette portion is slid to extend the sheet cassette;]

a second fixed portion which fixes the rear end regulating member to the second cassette portion at a position corresponding to the size of a sheet to be stored;

*an operating portion provided on the rear end regulating member which releases the fixing of the first cassette portion and the second cassette portion by the first fixed portion and which releases the fixing of the rear end regulating member and the second cassette portion by the second fixed portion;* and a third fixed portion which fixes the rear end regulating member and the second cassette portion in such a way that the second cassette portion and the rear end regulating member slide and move on the first cassette portion as one body, wherein, when the second cassette portion is slid to shorten the [sheet cassette] *size of the sheet storage portion* and is positioned at a predetermined position, the third [fixing] *fixed* portion is released by engaging a fixing releasing member provided on the first cassette portion so as to release the fixing between the rear end regulating member and the second cassette portion, and when the third fixed portion is released *at the predetermined position*, the second fixed portion is configured to release the fixing of the rear end regulating member by [either the] *an* operation of [which] the operating portion [is press-operated in the shortening direction or the operation of which the operating portion is press-operated in the extending direction].

5. The [sheet feeding device] *image forming apparatus* according to claim 4, wherein the *first* fixed portion has:

an engaged portion provided in the first cassette portion; and an engaging portion which is provided in the second cassette portion, and engages the engaged portion, an operating portion which moves the engaging portion in order to release engaging between the engaging portion and the engaged portion even when the operating portion is pressed in either of the two directions of the shortening direction, and the extending direction.

6. The [sheet feeding device] *image forming apparatus* according to claim 5, wherein the engaged portion is provided along a sliding range of the second cassette portion.

*7. The sheet feeding device according to claim 1, wherein the fixing of the first fixed portion is released by either an operation of which the operating portion is press-operated in a shortening direction where the second cassette portion is slid to shorten the size of the sheet storage portion or an operation of which the operating portion is press-operated in an extending direction where the second cassette portion is slid to extend the size of the sheet storage portion.*

*8. The image forming apparatus according to claim 4, wherein the fixing of the first fixed portion is released by either an operation of which the operating portion is press-operated in a shortening direction where the second cassette portion is slid to shorten the size of the sheet storage portion or an operation of which the operating portion is press-operated in an extending direction where the second cassette portion is slid to extend the size of the sheet storage portion.*

* * * * *